United States Patent
Miyazaki et al.

(10) Patent No.: US 9,489,070 B2
(45) Date of Patent: Nov. 8, 2016

(54) INFORMATION PROCESSING APPARATUS, INFORMATION PROCESSING METHOD, AND PROGRAM

(75) Inventors: Reiko Miyazaki, Tokyo (JP); Yasushi Okumura, Tokyo (JP)

(73) Assignee: SONY CORPORATION, Tokyo (JP)

(\*) Notice: Subject to any disclaimer, the term of this patent is extended or adjusted under 35 U.S.C. 154(b) by 92 days.

(21) Appl. No.: 14/232,728

(22) PCT Filed: Jul. 5, 2012

(86) PCT No.: PCT/JP2012/004365
§ 371 (c)(1),
(2), (4) Date: Jan. 14, 2014

(87) PCT Pub. No.: WO2013/011648
PCT Pub. Date: Jan. 24, 2013

(65) Prior Publication Data
US 2014/0168129 A1  Jun. 19, 2014

(30) Foreign Application Priority Data

Jul. 21, 2011 (JP) ................. 2011-159815

(51) Int. Cl.
*G06F 3/041* (2006.01)
*G06F 1/16* (2006.01)
*G06F 3/0482* (2013.01)
*G06F 3/0346* (2013.01)
*G06F 3/0484* (2013.01)

(52) U.S. Cl.
CPC ............ *G06F 3/041* (2013.01); *G06F 1/1626* (2013.01); *G06F 1/1694* (2013.01); *G06F 3/0346* (2013.01); *G06F 3/0482* (2013.01); *G06F 3/04842* (2013.01)

(58) Field of Classification Search
CPC ............... G06F 1/1626; G06F 1/1694; G06F 3/04842; G06F 3/0346; G06F 3/041; G06F 3/0482
See application file for complete search history.

(56) References Cited

U.S. PATENT DOCUMENTS

| 8,340,726 B1 * | 12/2012 | Fujisaki | H04M 19/04 345/168 |
|---|---|---|---|
| 2004/0100441 A1 * | 5/2004 | Rekimoto et al. | 345/158 |
| 2005/0212767 A1 | 9/2005 | Marvit et al. | |
| 2010/0004013 A1 | 1/2010 | Iwayama et al. | |
| 2011/0169737 A1 | 7/2011 | Ito | |

FOREIGN PATENT DOCUMENTS

| GB | 2 358 336 A | 7/2001 |
|---|---|---|
| JP | 2005-221816 A | 8/2005 |

(Continued)

OTHER PUBLICATIONS

U.S. Appl. No. 14/360,390, filed May 23, 2014, Miyazaki.
International Search Report issued Sep. 4, 2012 in PCT/JP2012/004365.
Extended European Search Report issued Feb. 17, 2015 in Patent Application No. 12814957.2.
First Office Action issued on May 19, 2016 in Chinese Application No. 1012/10244633.8 (with English translation), 23 pgs.

*Primary Examiner* — Charles Hicks
(74) *Attorney, Agent, or Firm* — Oblon, McClelland, Maier & Neustadt, L.L.P

(57) ABSTRACT

An information processing apparatus that controls a display to display first layer data, detects movement of the information processing apparatus, and controls the display to display second layer data corresponding to the first layer data together with the first layer data based on a movement detected by the detection unit.

20 Claims, 17 Drawing Sheets

(56) References Cited

FOREIGN PATENT DOCUMENTS

| JP | 2008-45914 A | 2/2008 |
| JP | 2009-27398 A | 2/2009 |
| JP | 2011-59820 A | 3/2011 |
| JP | 2011-82891 A | 4/2011 |

* cited by examiner

[Fig. 1]

Fig. 7A
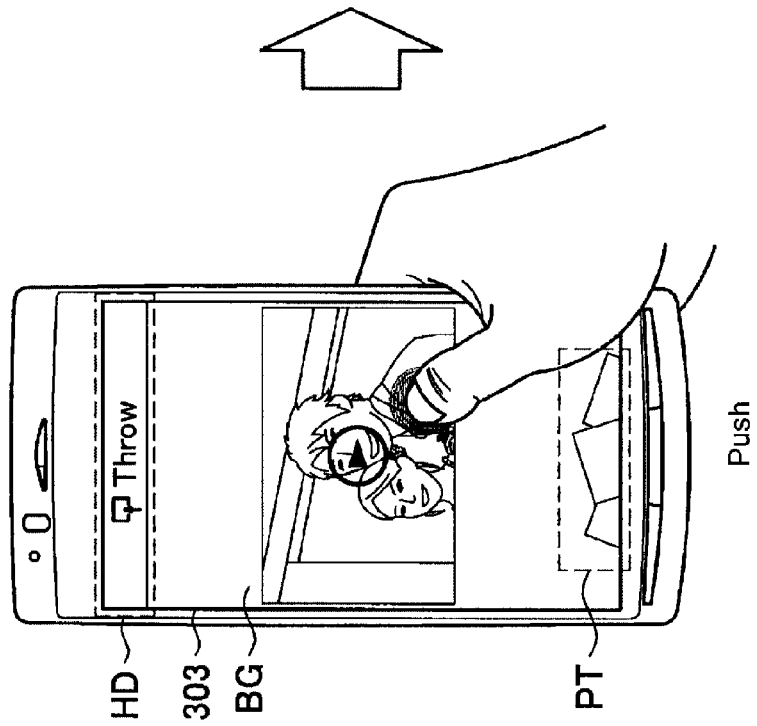
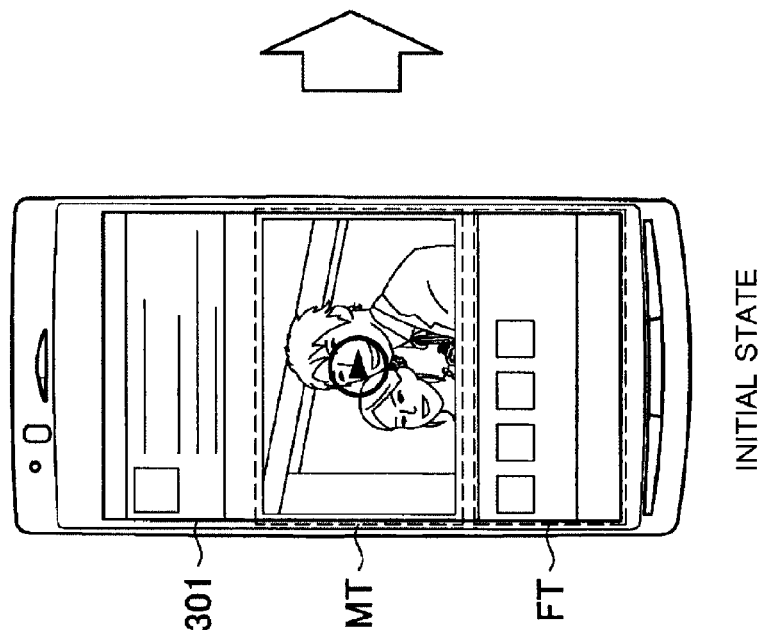
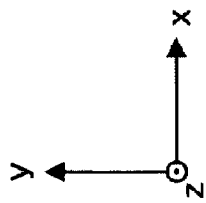

Fig. 7C
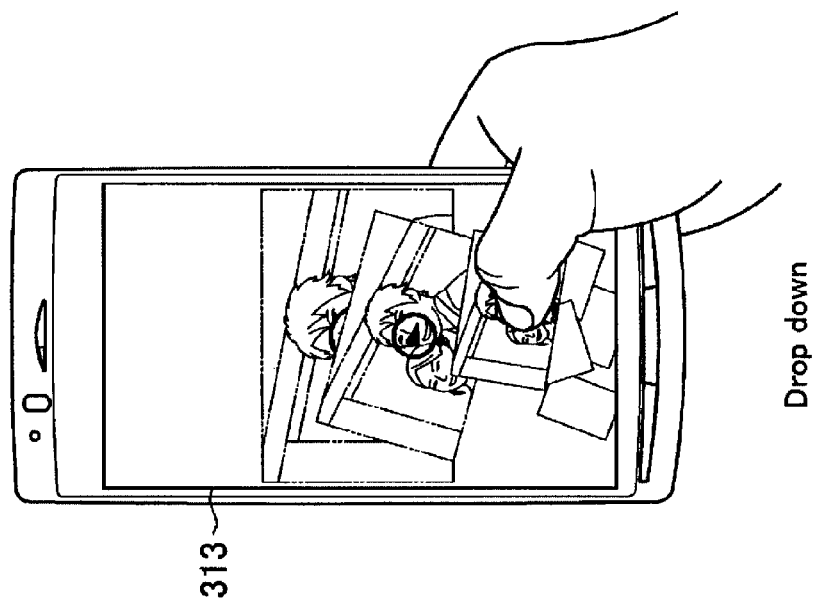
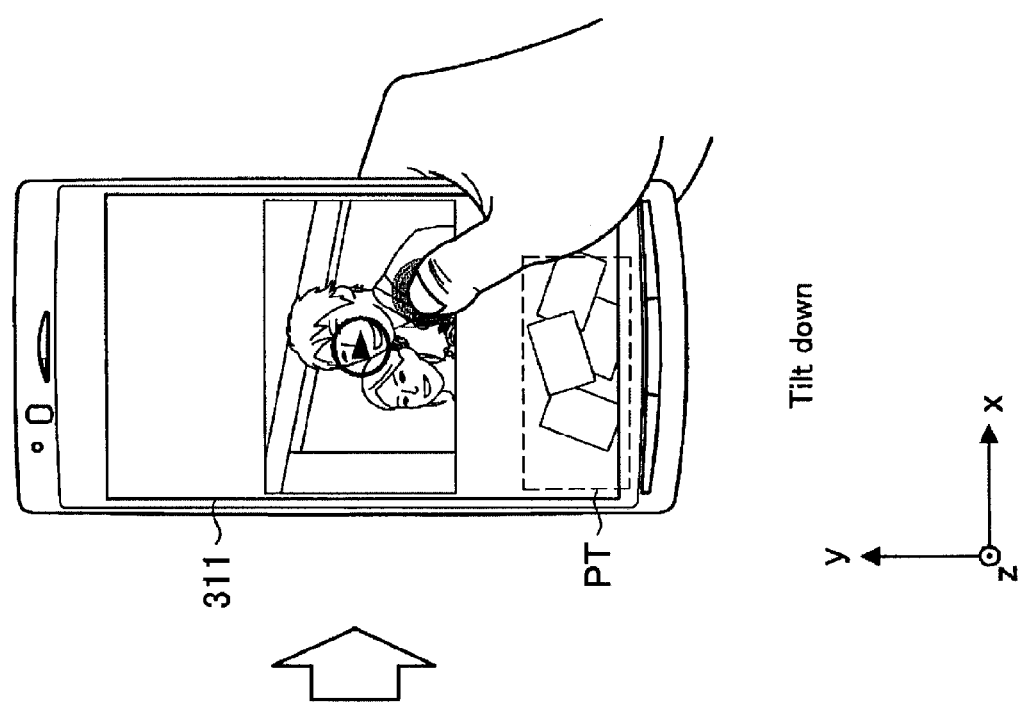

1

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

In an operation of an information processing apparatus, selection items of a layered structure are sequentially selected to determine an operation of the information processing apparatus. For example, Patent Document 1 discloses an information processing apparatus that uses a touch panel to operate selection items of a layered structure. It is described that the information processing apparatus displays a desired selection item by a scroll operation on the touch panel, selects the selection item by a touch operation on the displayed selection item, and determines the selection of the selection item by a push operation with respect to the selected selection item.

CITATION LIST

Patent Literature

PTL 1: Japanese Patent Application Laid-Open No. 2011-59820

SUMMARY

Technical Problem

However, a method of operating an information processing apparatus is diversified, and further operability improvement is required. Therefore, the present disclosure proposes a new and improved information processing apparatus, information processing method, and program that may improve an operability in an operation of selecting a selection item of a layered structure.

Solution to Problem

The present disclosure provides an information processing apparatus comprising:
a processor that controls a display to display first layer data; and
a detection unit that detects movement of the information processing apparatus, wherein
the processor controls the display to display second layer data corresponding to the first layer data together with the first layer data based on a movement detected by the detection unit.
According to such a configuration, detection unit is a tilt detection unit that detects a tilt movement of the information processing apparatus.
Also, the present disclosure provides a method performed by an information processing apparatus, the method comprising:
controlling, by a processor of the information processing apparatus, a display to display first layer data;
detecting, by a detection unit of the information processing apparatus, movement of the information processing apparatus; and
controlling, by the processor, the display to display second layer data corresponding to the first layer data together with the first layer data based on a detected movement.
Also, the present disclosure provides a non-transitory computer-readable medium including computer program instructions, which when executed by an information processing apparatus, cause the information processing apparatus to perform a method comprising:
controlling a display to display first layer data;
detecting movement of the information processing apparatus; and
controlling the display to display second layer data corresponding to the first layer data together with the first layer data based on a detected movement.

Advantageous Effects of Invention

According to the present disclosure described above, an operability in an operation of selecting a selection item of a layered structure may be improved.

BRIEF DESCRIPTION OF DRAWINGS

FIG. 7A is an explanatory diagram of an operation of selecting content to be shifted in the same embodiment.

FIG. 7C is an explanatory diagram of an operation at the time of adding content in a playlist.

DESCRIPTION OF EMBODIMENTS

Hereinafter, preferred embodiments of the present disclosure will be described in detail with reference to the accompanying drawings. In addition, in this specification and the drawings, elements that have substantially the same functional configuration will be denoted with the same reference signs, and descriptions thereon will not be repeated.

In addition, a description will be given in the following order.
1. First Embodiment
1-1. Example of Configuration
1-2. Example of Operation
1-3. Example of Operation Using Tilt Degree (Example of Arranging Transmission Destination Device According to Distance)
1-4. Example of Display Screen
2. Second Embodiment (Generalized Example of Application)
2-1. Example of Configuration
2-2. Example of Operation
3. Third Embodiment (Example of Application to Imaging Function)
3-1. Example of Configuration
4. Example of Hardware Configuration 1. First Embodiment 1-1. Example of Configuration First, a configuration of an information processing apparatus according to a first embodiment as an example to which a technology disclosed in the present specification is applicable will be described with reference to FIGS. 1 to 9. The technology disclosed in the present specification may be applicable to an apparatus that has a function of detecting a tilt.

Figure 1:
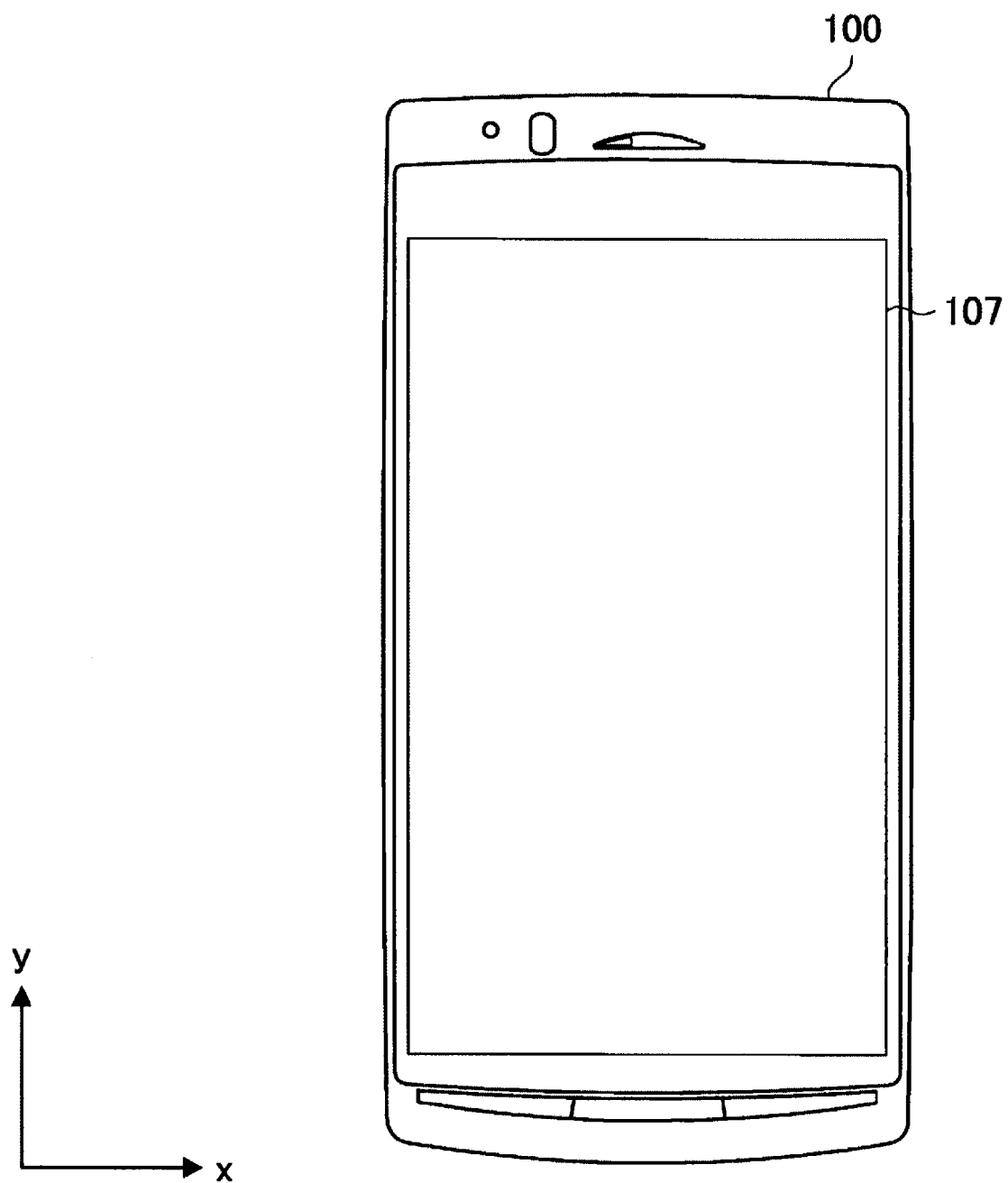
FIG. 1 is an explanatory diagram illustrating an example of an external appearance of an information processing apparatus according to an embodiment of the present disclosure.
Figure 2:
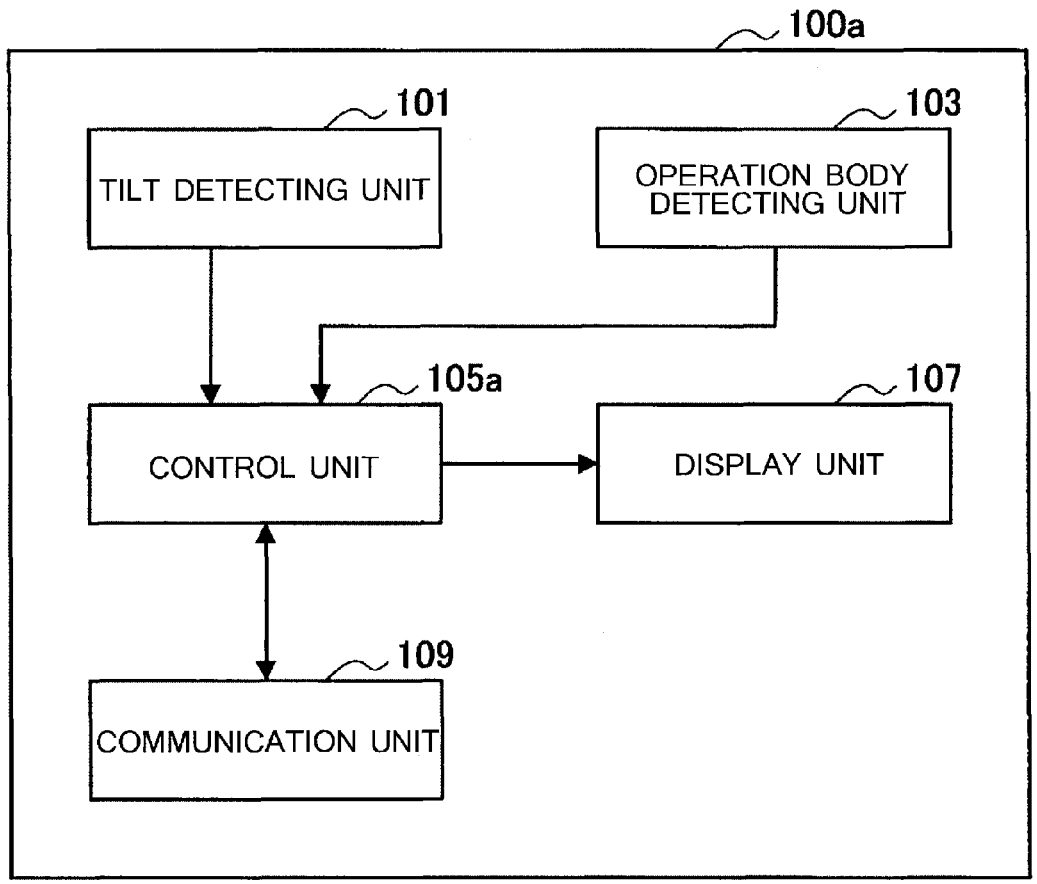
FIG. 2 is a functional block diagram of an information processing apparatus according to a first embodiment of the present disclosure.
Figure 3:
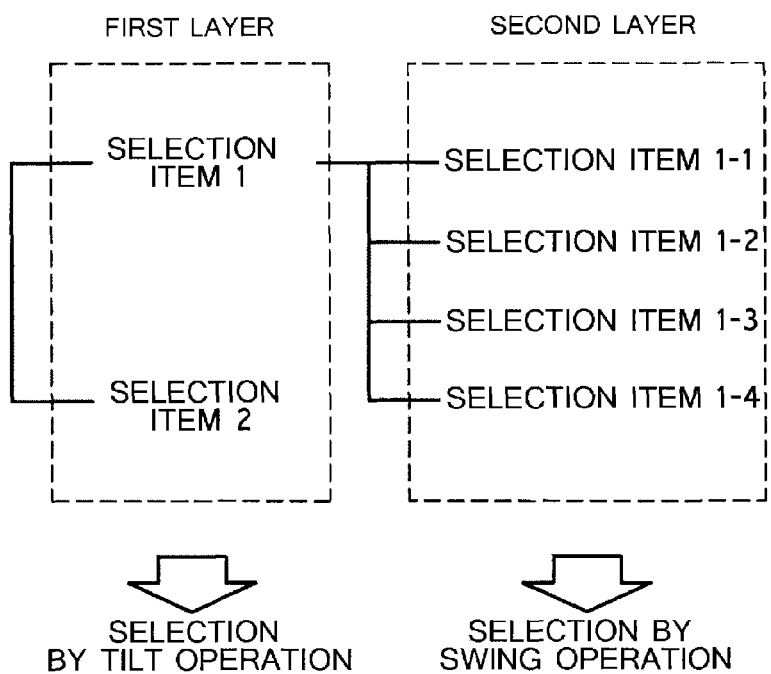
FIG. 3 is an explanatory diagram of selection items of a layered structure and an operation of the information processing apparatus according to the same embodiment.
Figure 4:
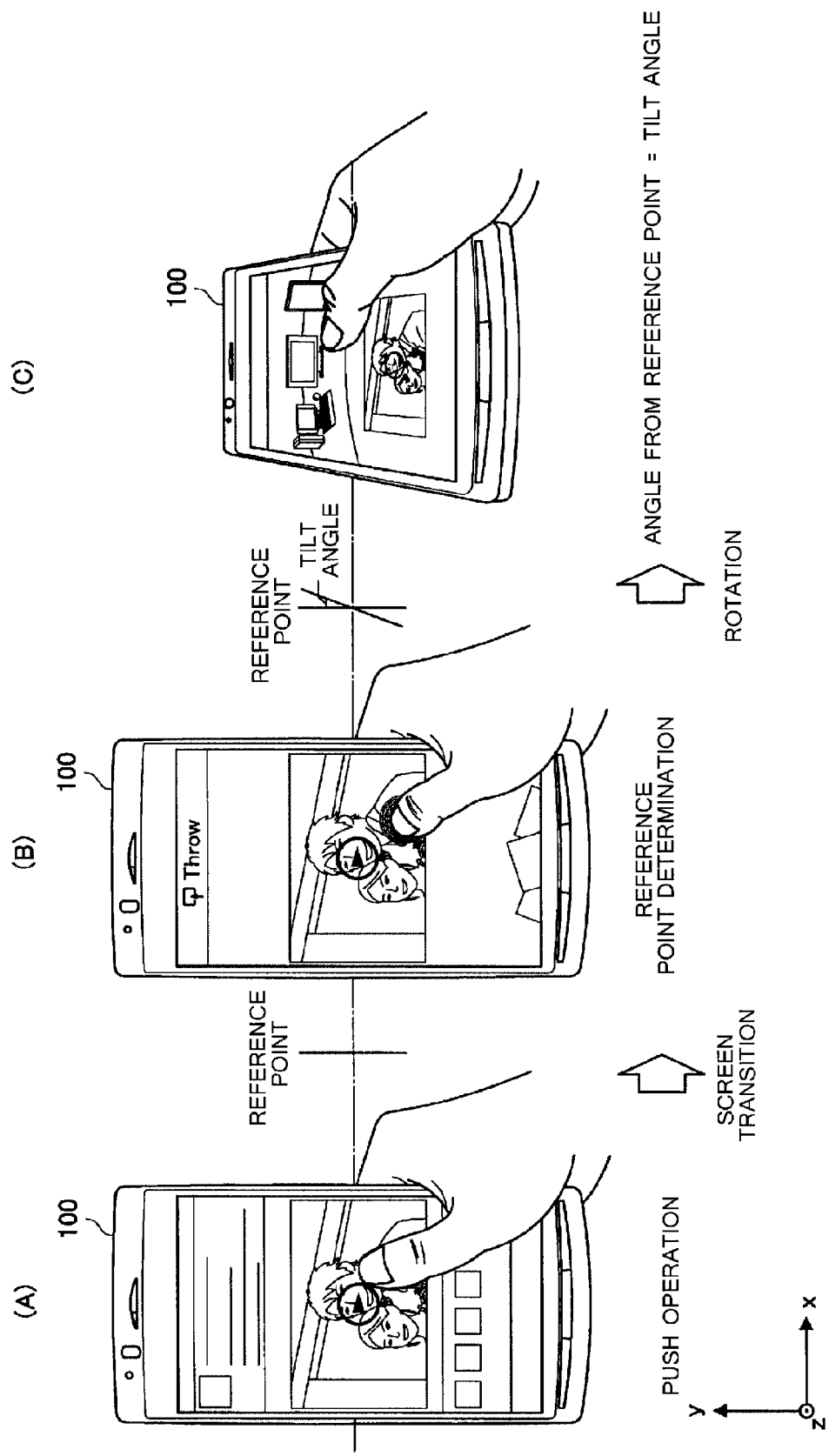
FIG. 4 is an explanatory diagram of a tilt operation used in the same embodiment.
Figure 5:
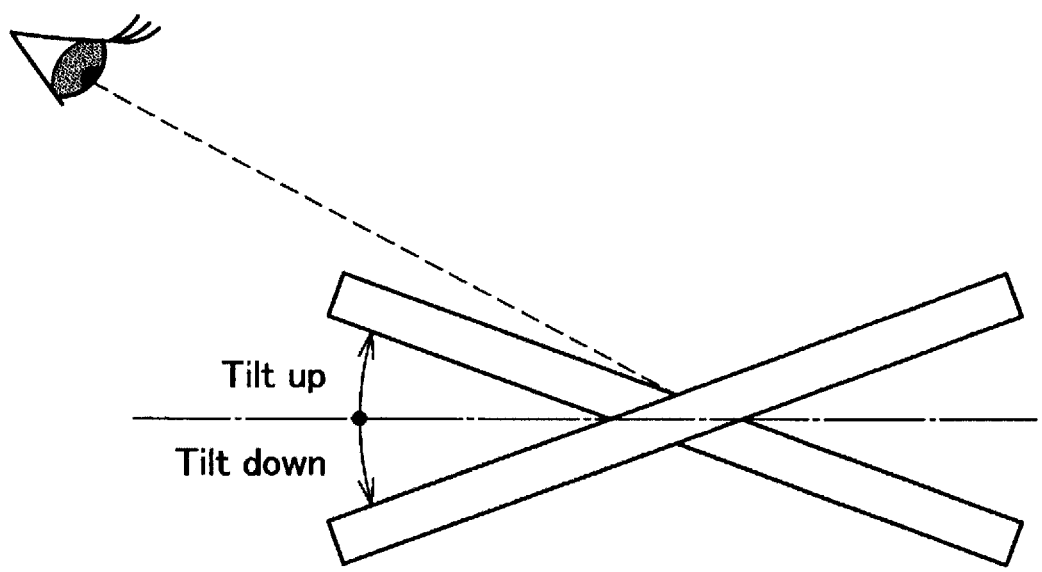
FIG. 5 is an explanatory diagram of the relation between a tilt operation and a tilt angle used in the same embodiment.
Figure 6:
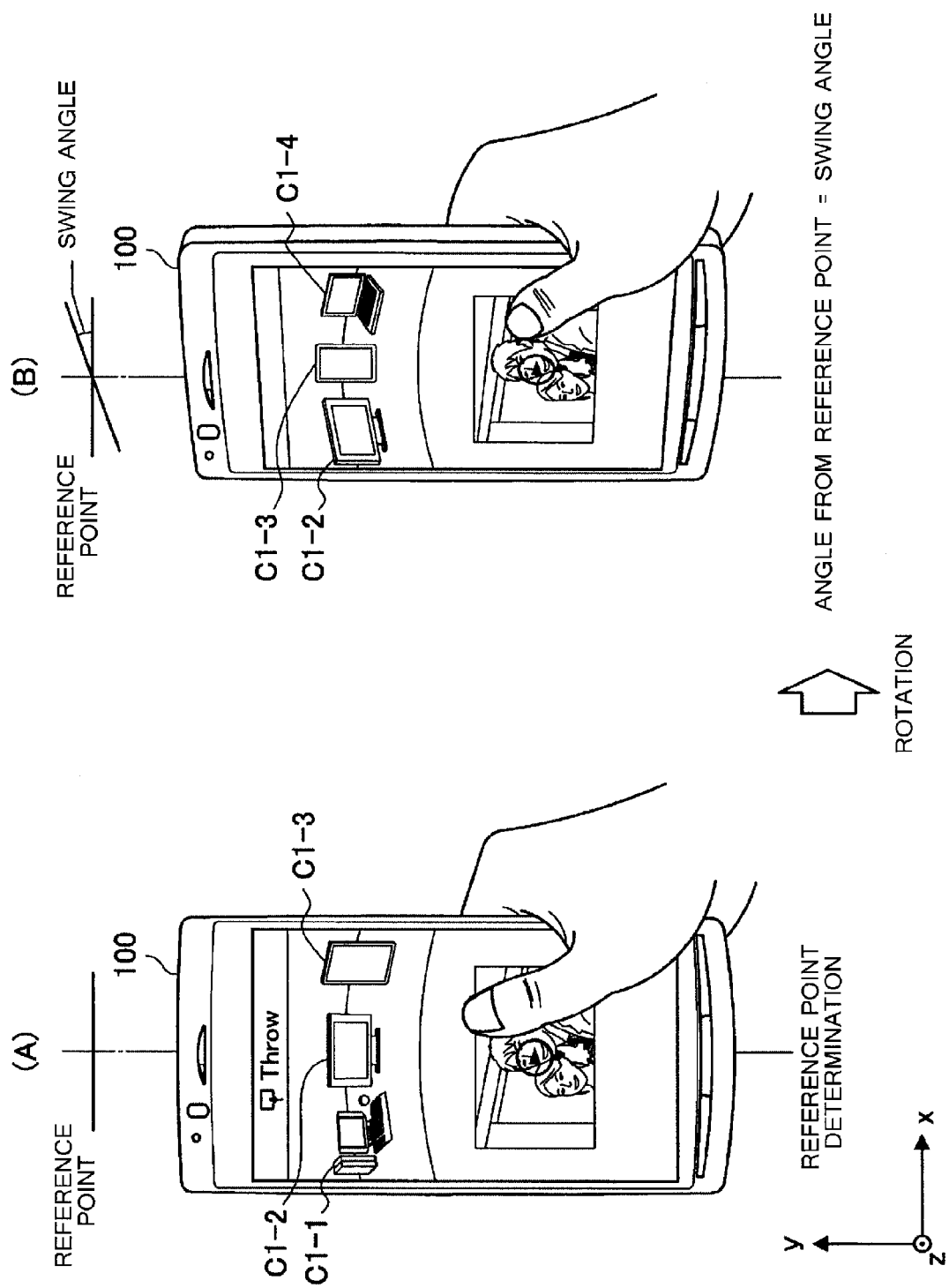
FIG. 6 is an explanatory diagram of a swing operation used in the same embodiment.
Figure 7B:
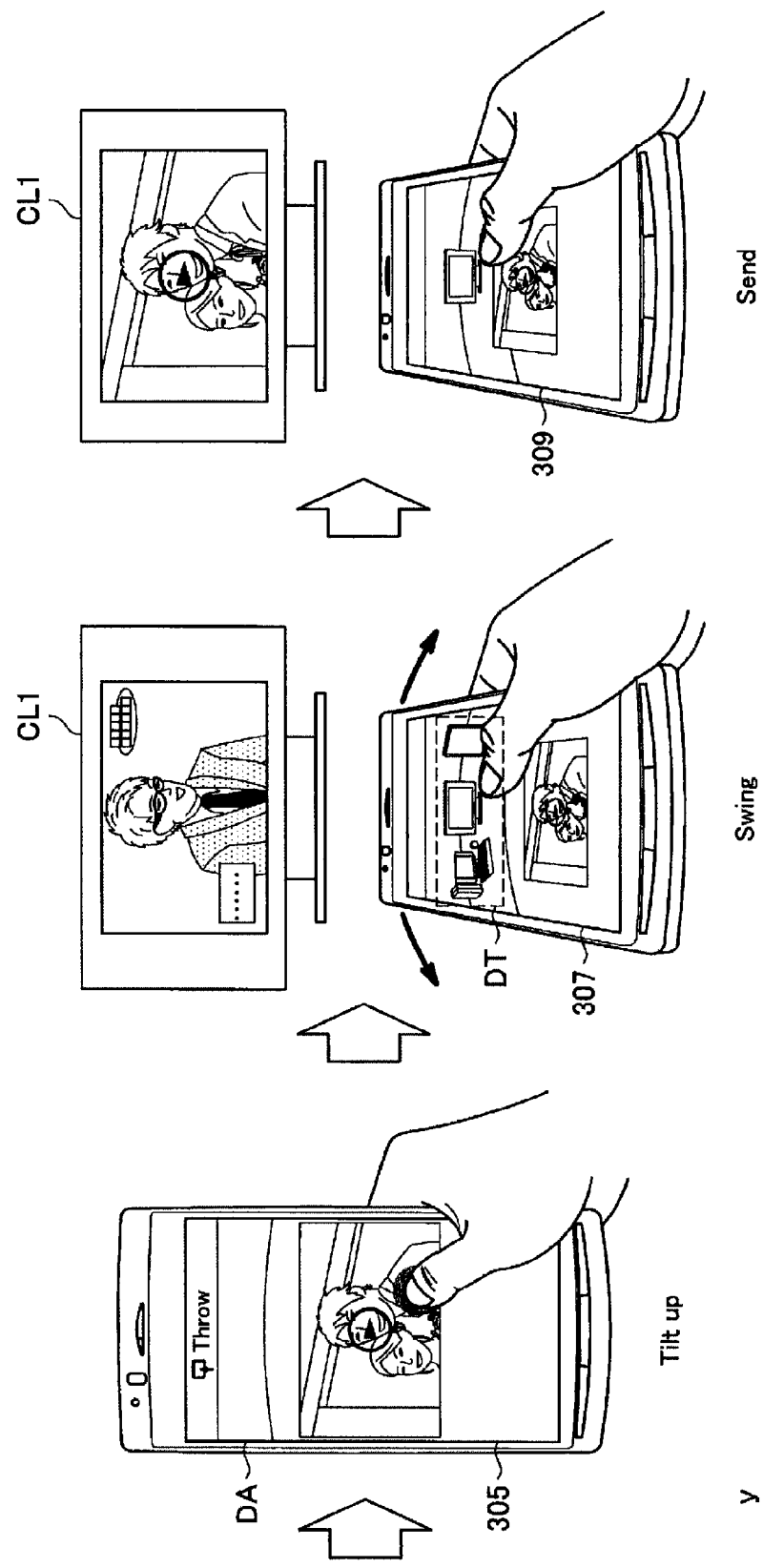
FIG. 7B is an explanatory diagram of an operation at the time of transmitting content to an external apparatus in the same embodiment.
Figure 8:
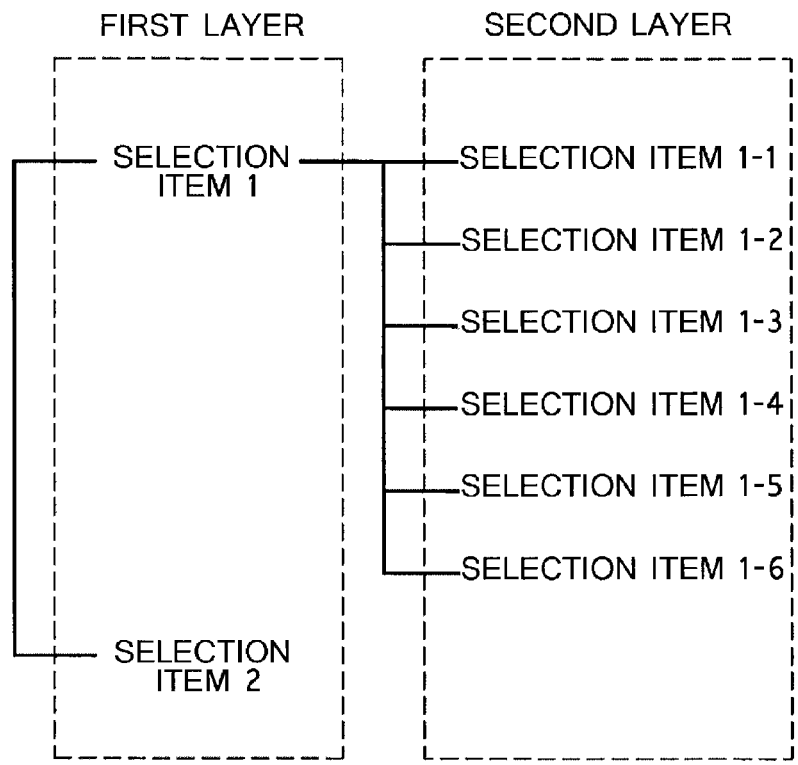
FIG. 8 is an explanatory diagram of selection items of a layered structure and an operation at the time when the information processing apparatus according to the same embodiment displays selection items in a step-by-step manner according to a tilt degree.
Figure 9:
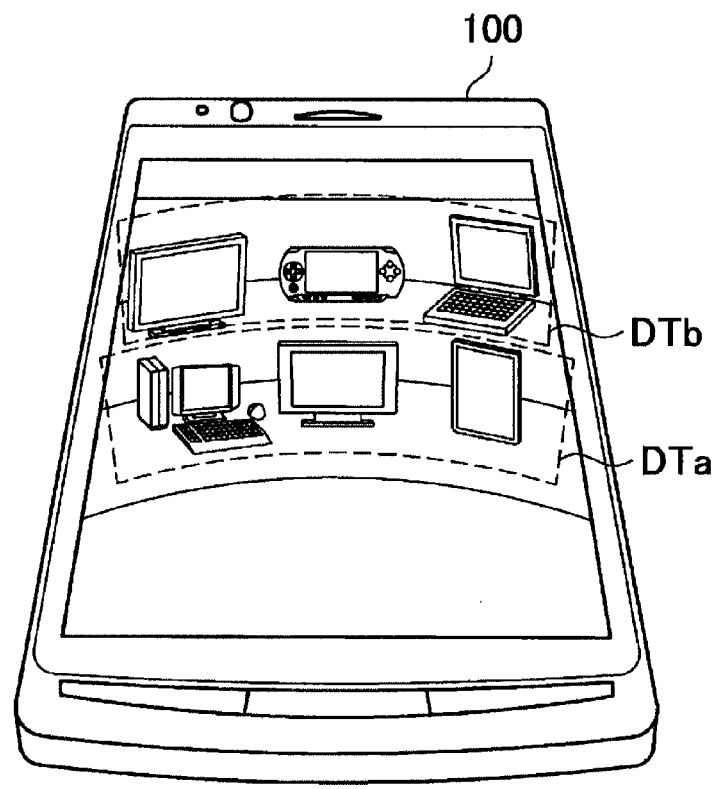
FIG. 9 is an example of a display screen where the information processing apparatus according to the same embodiment displays selection items in a step-by-step manner.

FIG. 1 is an explanatory diagram illustrating an example of an external appearance of an information processing apparatus according to an embodiment of the present disclosure. FIG. 2 is a functional block diagram of an information processing apparatus according to a first embodiment of the present disclosure. FIG. 3 is an explanatory diagram of selection items of a layered structure and an operation of the information processing apparatus according to the same embodiment. FIG. 4 is an explanatory diagram of a tilt operation used in the same embodiment. FIG. 5 is an explanatory diagram of the relation between a tilt operation and a tilt angle used in the same embodiment. FIG. 6 is an explanatory diagram of a swing operation used in the same embodiment. FIG. 7A is an explanatory diagram of an operation of selecting content to be shifted in the same embodiment. FIG. 7B is an explanatory diagram of an operation at the time of transmitting content to an external apparatus in the same embodiment. FIG. 7C is an explanatory diagram of an operation at the time of adding content in a playlist. FIG. 8 is an explanatory diagram of selection items of a layered structure and an operation at the time when the information processing apparatus according to the same embodiment displays selection items in a step-by-step manner according to a tilt degree. FIG. 9 is an example of a display screen where the information processing apparatus according to the same embodiment displays selection items in a step-by-step manner.

First, FIG. 1 illustrates an example of an information processing apparatus 100 to which the technology of the present specification is applied. The information processing apparatus 100 is a terminal apparatus that has a function of detecting a tilt of a casing. For example, the information processing apparatus 100 may be a terminal apparatus such as a portable phone, a portable music play apparatus, a portable image processing apparatus, a portable game console, a tablet-type terminal, a Personal Computer (PC), or the like.

The information processing apparatus 100 includes a display unit 107 on a surface of its casing. A touch sensor may be overlapped with the display unit 107 to detect a position of an operation body on a display screen displayed on the display unit 107. Also, in the present specification and the drawings, the longitudinal direction of the casing of the information processing apparatus 100 is defined as a y direction (example of a first direction), and the lateral direction of the casing is defined as an x direction (example of a second direction).

Referring to FIG. 2, a functional configuration of an information processing apparatus 100a according to the first embodiment of the present disclosure is illustrated. Also, in the present specification and drawings, a plurality of elements having substantially the same functional configuration may be distinguished by different alphabets attached after the same reference sign. For example, a plurality of elements having substantially the same functional configuration, if necessary, are distinguished like an information processing apparatus 100a and an information processing apparatus 100b. However, if each of a plurality of elements having substantially the same functional configuration need not be especially distinguished, only the same reference sign is assigned thereto. For example, if an information processing apparatus 100a, an information processing apparatus 100b, and the like, need not be especially distinguished, the information processing apparatuses are simply referred to as information processing apparatuses 100.

The information processing apparatus 100a mainly includes a tilt detecting unit 101, an operation body detecting unit 103, a control unit 105, a display unit 107, and a communication unit 109.

(Tilt Detecting Unit)

The tilt detecting unit 101 has a function of detecting a tilt of the casing of the information processing apparatus 100. The tilt detecting unit 101 may be, for example, a motion sensor such as an angular velocity sensor, an acceleration sensor, an angle sensor, or the like. Also, the tilt detecting unit 101 may be realized by a combination of at least two or more of the above motion sensors. An example of the angular velocity sensor used herein may be a vibration-type gyro sensor, a rotation coma gyro sensor, or the like. Also, the acceleration sensor used herein may be, for example, a piezoresistive acceleration sensor, a piezoelectric acceleration sensor, a capacitive acceleration sensor, or the like. Also, an example of the angle sensor may be a geomagnetic sensor. Also, it may be preferable that the motion sensor used as the tilt detecting unit 101 is a sensor capable of detecting a rotation angle with respect to three axes. The tilt detecting unit 101 may provide information about a detected tilt to the control unit 105.

(Operation Body Detecting Unit)

The operation body detecting unit 103 has a function of detecting an operation by an operation body. The operation body detecting unit 103 may be, for example, realized by a touch sensor that is installed overlappingly on the display unit 107 to detect a position of an operation body with respect to a display screen displayed on the display unit 107. The operation body may be, for example, a user's finger or a stylus pen. The operation body detecting unit 103 may provide information about an operation by a detected operation body to the control unit 105.

(Control Unit)

The control unit 105a has a function of controlling an overall operation of the information processing apparatus 100a. For example, the control unit 105a may control an operation of the information processing apparatus 100a based on at least one of information about a tilt detected by the tilt detecting unit 101 and information about an operation by an operation body detected by the operation body detecting unit 103. Also, the control unit 105a may control a display of a display screen displayed on the display unit 107, based on at least one of information about a tilt detected by the tilt detecting unit 101 and information about an operation by an operation body detected by the operation body detecting unit 103. Also, the control unit 105a may control a connection of an external apparatus through the communication unit 109.

For example, a description will be given of control of the control unit 105 of the information processing unit 100 in a case where selection items for determining an operation of the information processing apparatus 100a are of a layered structure as illustrated in FIG. 3. The control unit 105 may select a selection item of a layered structure, based on an operation of a plurality of steps using a tilt detected by the tilt detecting unit 101. For example, assume a case where selection items of a first layer include a selection item 1 and a selection item 2, and selection items of a second layer lower than the first layer include a selection item 1-1, a selection item 1-2, a selection item 1-3, and a selection item 1-4. For example, the control unit 105 may first select any one of the selection item 1 and the selection item 2 based on a tilt operation using a tilt with respect to a y direction of the casing. Herein, the y direction is an example of a first direction, and the tilt operation is an example of a first operation using a tilt with respect to the first direction. Also, if any selection item is selected from the first layer and thereafter a selection item of the lower layer of the selected selection item is present, then the control unit 105 may select any one of the selection item 1-1, the selection item 1-2, the selection item 1-3, and the selection item 1-4 based on a swing operation using a tilt with respect to an x direction of the casing. Also, herein, the x direction is an example of a second direction perpendicular to the first direction, and the swing operation is an example of a second operation using a tilt with respect to the second direction.

Herein, a tilt operation will be described with reference to FIGS. 4 and 5. The tilt operation is an operation using a tilt of the casing of the information processing apparatus 100 from a state of a time point as a reference. Herein, for example, as illustrated in FIG. 4, a reference point as a reference may be a time point of detecting a push operation of an operation body with respect to a display screen. When a user performs a push operation with respect to the information processing apparatus 100, the control unit 105 may detect a change in the tilt of the casing with respect to the state of the casing at this time point. Accordingly, the control unit 105 determines that a tilt angle is a tilted angle of the casing from the y direction with respect to the reference point. Herein, as illustrated in FIG. 5, a tilt operation in an ascending direction of the front side of the casing when viewed from the user is called a tilt up, and a tilt operation in a descending direction of the front side of the casing when viewed from the user is called a tilt down.

Next, a swing operation will be described with reference to FIG. 6. The swing operation is also an operation using a tilt of the casing of the information processing apparatus 100 from a state of a time point as a reference. Herein, a reference point may be, for example, a time point of the transition from a tilt operation to a swing operation. That is, the control unit 105 may determine that the reference point is a point of the conversion from a state with a tilt change with respect to the y direction to a state with a tilt change with respect to the x direction without a tilt change with respect to the y direction. Then, the control unit 105 may determine that a swing angle is a tilted angle of the casing from the x direction with respect to the reference point. When a swing angle changes, the control unit 105 may change a selection item display according to this swing angle. For example, herein, assume that a selection item C1-1, a selection item C1-2, and a selection item C1-3 are displayed before the change of a swing angle. In this case, when the user changes a swing angle, the display of the selection items C rotates such that the selection item C1-2, the selection item C1-3, and a selection item C1-4 are displayed. Herein, for example, the control unit 105 may select a selection item displayed in the center. The control unit 105 changes the selected selection item whenever the user changes the swing angle to change the display of the selection items C.

Herein, an example of a case where the present technology is applied to the selection of a selection item of a layered structure in a scene of selecting a content shift destination will be described with reference to FIG. 7. Herein, among the selection items illustrated in FIG. 3, the first layer is a layer for selecting whether a content shift destination is inside or outside the information processing apparatus 100a. Also, herein, the selection items include a layer for selecting a content transmission destination device. The selection item 1 is "to transmit content to an external apparatus", and the selection item 2 is "to add content in a playlist". As illustrated in a display screen 301 of FIG. 7A, when in a state where a piece of content is selected and the operation body detecting unit 103 detects a push operation with respect to the content, the control unit 105a displays a display screen 303 on which a header HD representing the selection item 1 and a playlist thumbnail group PT representing the selection item 2 are displayed. By this display screen 303, the user may know that he can perform an operation of selecting any one of the selection item 1 and the selection item 2. Also, in this state, when a tilt up operation is performed, it proceeds to FIG. 7B, and when a tilt down operation is performed, it proceeds to FIG. 7C.

First, a case where a tilt up operation is detected will be described with reference to FIG. 7B. When a tilt up operation is performed, a display screen 305 including a device base area DA for displaying a selection item of a transmission destination device is displayed. In addition, when a tilt angle is increased, the control unit 105a displays a display screen 307 on which a device thumbnail DT is displayed on the device base area DA. Herein, the control unit 105a may determine a display arrangement of the device thumbnail DT based on a frequency at which a selection item corresponding to each device thumbnail DT is selected. For example, the control unit 105a may arrange a selection item with a high selection frequency at a position that is easily selected by the user. For example, the control unit 105a may arrange a selection item with the highest selection frequency at the center. When a swing operation is performed on the display screen 307, a selection item represented by the device thumbnail DT rotates and simultaneously a selected selection item changes. Herein, the control unit 105a selects the selection item corresponding to the device thumbnail DT displayed in the center. Also, in a state where any one of the selection items is selected, when a confirmation operation by an operation body is inputted, the control unit 105a may confirm the selection of the selection item. Herein, when a drag operation with respect to a device thumbnail representing the selected selection item is detected, this selection (transmission destination device) is confirmed. Accordingly, the control unit 105a transmits content to a confirmed transmission destination device CL1 through the communication unit 109.

On the other hand, a case where a tilt down operation is detected will be described with reference to FIG. 7C. When a tilt down operation is detected, the control unit 105a determines a state where the selection item 2 further sliding in the playlist thumbnail group PT displayed on the display screen 303 is selected. Then, in the state where the selection item 2 is selected and a confirmation operation by the operation body is inputted, the control unit 105a may confirm the selection of the selection item. Herein, when a drag operation toward the displayed playlist thumbnail group PT is performed, the control unit 105a confirms the selection of the selection item 2 and adds the selection item 2 in a playlist.

In addition, when there are many selection items as illustrated in FIG. 8, the selection items may be displayed by being divided into a plurality of steps as illustrated in FIG. 9. When each layer corresponds to a degree of a tilt detected by the tilt detecting unit 101 and herein a tilt angle is within a predetermined first range, it becomes a state where a selection item corresponding to a device thumbnail displayed at the center among a device thumbnail group DTa is selected. Also, when the tilt angle is within a second range larger than the first range, it becomes a state where a selection item corresponding to a device thumbnail displayed at the center among a device thumbnail group DTb is selected. That is, the user uses a combination of a tilt angle and a swing operation in order to select a selection item of the second layer. In addition, the control unit 105a may acquire a distance between the communication unit 109 and a transmission destination device represented by a device thumbnail, and may determine an arrangement of the device thumbnail displayed as a selection item, based on the distance. For example, the control unit 105a may determine an arrangement of the device thumbnail so that the user can easily select a transmission destination device that is at a short distance. The control unit 105a may select a smaller tilt angle as the distance from the transmission destination device becomes smaller. Also, the control unit 105a may arrange a transmission destination device, which is at a short distance, in the center.

(Display Unit 107)

Returning again to FIG. 2, a description will be continued. The display unit 107 is an example of an output device, and may be a display device such as a liquid crystal display (LCD) device, an organic light emitting diode (OLED) display device, or the like. The display unit 107 may provide a display screen to the user under the control of the control unit 105.

(Communication Unit 109)

The communication unit 109 is a communication interface for allowing the information processing apparatus 100 to communicate with another apparatus. For example, the communication unit 109 may be a wireless communication interface for communicating with another apparatus by wireless. Specifically, the communication unit 109 may be an interface for connecting with a digital living network alliance (DLNA) compliant device by wireless. The information processing apparatus 100a may function as a DLNA server, and may transmit content to a connected DLNA client.

1-2. Example of Operation

Figure 10:
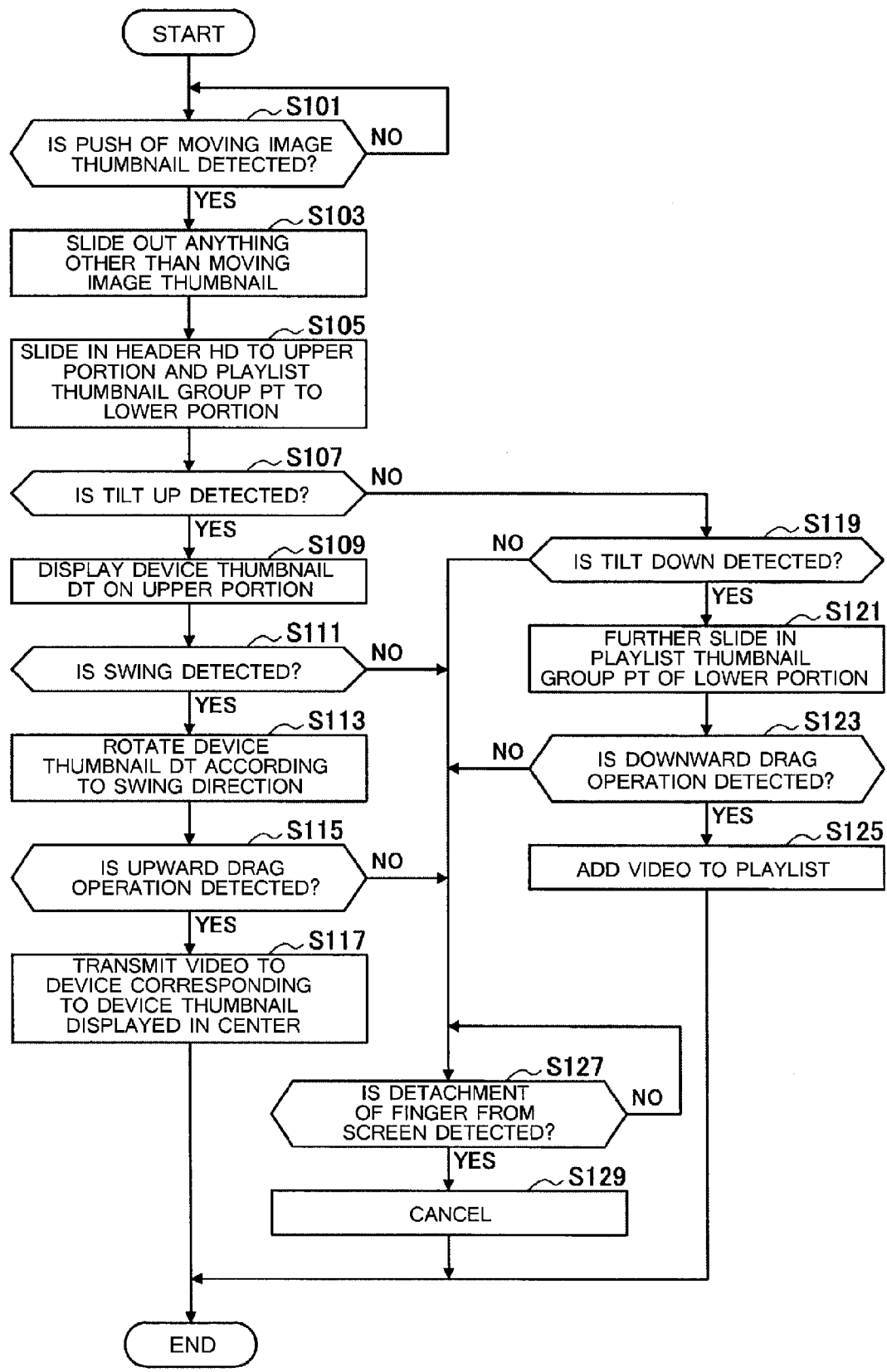
FIG. 10 is a flow chart illustrating an example of an operation in an operation of determining a content shift destination of the information processing apparatus according to the same embodiment.
Figure 11:
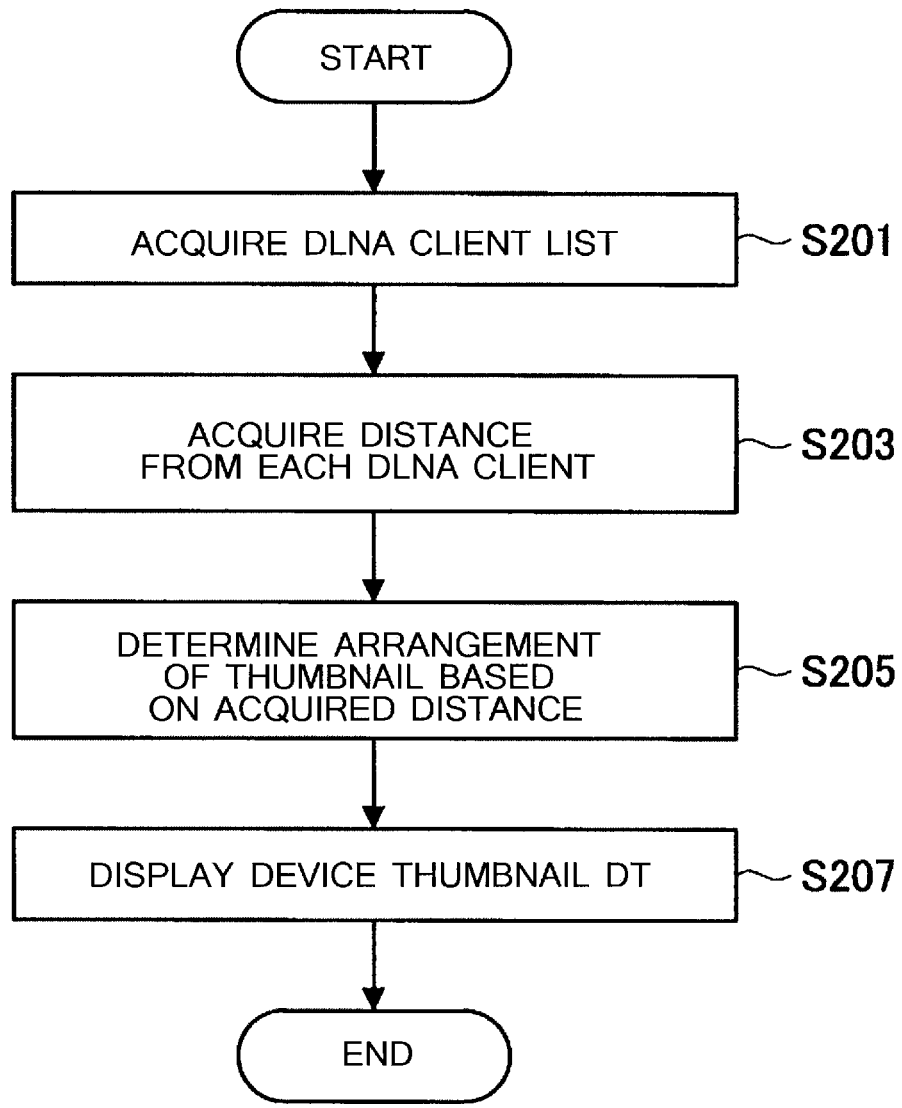
FIG. 11 is a flow chart illustrating an example of an operation at the time of arranging a device thumbnail according to a distance from a transmission destination device in the same embodiment.

Next, an operation of an information processing apparatus according to the present embodiment will be described with reference to FIGS. 10 and 11. FIG. 10 is a flow chart illustrating an example of an operation in an operation of determining a content shift destination of the information processing apparatus according to the same embodiment. FIG. 11 is a flow chart illustrating an example of an operation at the time of arranging a device thumbnail according to a distance from a transmission destination device in the same embodiment.

Referring to FIG. 10, the control unit 105a determines whether a push operation with respect to a moving image thumbnail MT is detected by the operation body detecting unit 103 (S101). If it is determined in step S101 that a push operation with respect to the moving image thumbnail MT is detected, the control unit 105a slides out anything other than the moving image thumbnail MT (for example, a footer FT or the like) (S103). Then, the control unit 105a slides in a header HD to an upper portion of a display screen, and slides in a playlist thumbnail group PT to a lower portion of the display screen (S105).

Next, the control unit 105a determines whether a tilt up operation is detected by the tilt detecting unit 101 (S107). Then, if a tilt up operation is detected, the control unit 105a displays a device thumbnail DT on an upper portion of the display screen and selects the transmission of content to an external apparatus (S109). After the device thumbnail DT is displayed, the control unit 105a determines whether a swing operation is detected by the tilt detecting unit 101 (S111). Herein, if a swing operation is detected, the control unit 105a rotates the device thumbnail DT according to a direction of the swing operation (S113).

The control unit 105a changes a display position of the device thumbnail DT by the swing operation, and selects a device thumbnail DT displayed in the center among these. When any device thumbnail DT is selected in this manner, the control unit 105a determines whether an upward drag operation, specifically a drag operation toward the selected device thumbnail DT, is detected by the operation body detecting unit 103 (S115). Herein, if a drag operation is detected, the control unit 105a transfers a moving image to a device corresponding to a device thumbnail displayed in the center (selected) (S117).

On the other hand, if a tilt up operation is not detected in step S107, the control unit 105a determines whether a tilt down operation is detected by the tilt detecting unit 101 (S119). Then, if it is determined in step S119 that a tilt down operation is detected, the control unit 105a further slides in the playlist thumbnail group PT of a lower portion of the display screen and selects the addition of content in a playlist (S121). Then, the control unit 105a determines whether a downward drag operation is detected by the operation body detecting unit 103 (S123). If a drag operation is detected in step S123, the control unit 105a adds a moving image in the playlist (S125).

Also, if a swing operation is not detected in step S111, if a drag operation is not detected in step S115, if a tilt down operation is not detected in step S119, and if a drag operation is not detected in step S123, the control unit 105a determines whether the detachment of a finger from the screen is detected by the operation body detecting unit 103 (S127). Then, if the detachment of a finger from the screen is detected, the control unit 105a cancels the so-far process and ends the operation (S129).

1-3. Example of Operation Using Tilt Degree

Example of Arranging Transmission Destination Device According to Distance

Also, when a device thumbnail DT is displayed in step S109 of FIG. 10, the control unit 105a may determine an arrangement of the device thumbnail DT based on a distance from each device. An operation of the control unit 105a in this case is illustrated in FIG. 11.

First, the control unit 105a acquires a DLNA client list (S201). Then, the control unit 105a acquires a distance from each DLNA client (S203). Next, the control unit 105a determines an arrangement of the device thumbnail DT based on the acquired distance (S205). As described above, it may be preferable that this arrangement is made such that the user can easily select a device that is at a short distance. For example, it may be preferable that a smaller tilt angle may be selected as the distance becomes smaller. Also, for example, the arrangement may be made nearer to the center as the distance becomes smaller. Then, the control unit 105a displays the device thumbnail DT in the determined arrangement (S207).

1-4. Example of Display Screen

Figure 12:
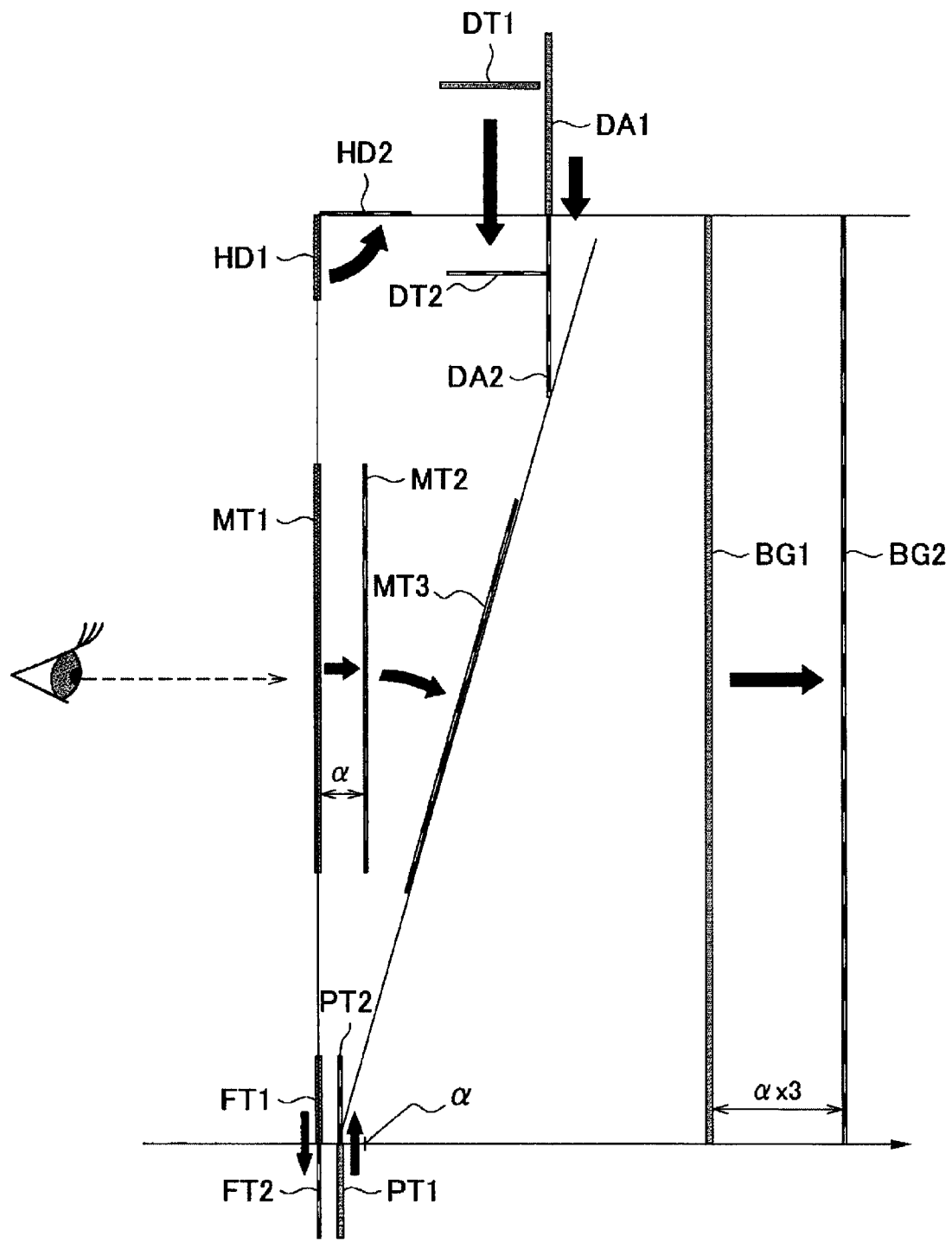
FIG. 12 is an explanatory diagram for describing the arrangement of an object on a display screen displayed in the same embodiment.

Herein, it may be preferable that a display screen for selecting selection items of a layered structure is displayed three-dimensionally. A three-dimensional representational power may be used to improve an operability of the user. Herein, the respective objects displayed on a display screen are represented by a positional relation as illustrated in FIG. 12. FIG. 12 is an explanatory diagram for describing the arrangement of an object on a display screen displayed in the same embodiment.

Reference signs illustrated in FIG. 12 correspond to the reference signs illustrated in FIG. 7. For example, the moving image thumbnail MT corresponds to the object represented by the reference sign illustrated in the left diagram of FIG. 7A. In FIG. 12, according to the states, a moving image thumbnail MT1, a moving image thumbnail MT2, and a moving image thumbnail MT3 are illustrated. The moving image thumbnail MT2 represents an arrangement of the moving image thumbnail MT after performance of a push operation as illustrated in the right diagram of FIG. 7A, and the moving image thumbnail MT may be moved down by the push operation by the distance of a in a backward direction when viewed from the user. Also, when the moving image thumbnail MT is moved down, a footer FT1 is simultaneously slid out in a downward direction to become an arrangement of a footer FT2. Also, a background BG changes from a position of a background BG1 to a position of a background BG2. Also, instead of the footer FT, the playlist thumbnail group PT is slid in to become an arrangement of a playlist thumbnail group PT2. At this time, the header HD is arranged at the position of a header HD1.

Next, when a tilt operation is performed, the moving image thumbnail MT becomes an arrangement of a moving image thumbnail MT3 according to a tilt angle. Herein, along with the tilt operation, the device base DA is slid in from the upper side of a display screen. When a tilt angle increases, the device thumbnail DT is displayed on the device base DA. At this time, an arrangement of the device base DA is represented by a device base DA2, and an arrangement of the device thumbnail DT is represented by a device thumbnail DT2.

1-5. Example of Effect

The information processing apparatus 100a according to the first embodiment of the present disclosure has been described above. In the present embodiment, the case of applying the technology of the present disclosure to a scene of transmission of content between devices corresponding to a DLNA has been described as a specific application example of the information processing apparatus that selects selection items of a layered structure by an operation of a plurality of steps using the detected tilt of the casing. According to the above configuration, the user performs a push operation of indicating content to be transmitted on the display screen with a finger, and may perform an operation of tilting (tilt up or tilt down) the casing without detaching the finger, thereby determining whether to move content to an external apparatus or perform an internal operation. Then, when the content is transmitted to the external apparatus, a transmission destination device may be selected by performing a swing operation using the tilt of the casing toward a further different direction.

Also, a drag operation or the like may be used to determine the selected selection item. An operation according to a tilt of the casing is intuitive, but may cause an erroneous operation if there is no feedback of a tilt degree. Therefore, a combination of separate operations by an operation body, such as a drag operation, may be used to reduce an erroneous operation.

2. Second Embodiment

Generalized Example of Application

In the first embodiment, an example of applying the present technology in a specific situation where content is transmitted to an external apparatus has been described above. However, the present technology may be more widely applied to an information processing apparatus that selects a selection item of a layered structure. Therefore, the more generalized present technology will be described herein.

(2-1. Configuration Example)

First, a functional configuration of an information processing apparatus according to a second embodiment of the present disclosure will be described with reference to FIG.

Figure 13:
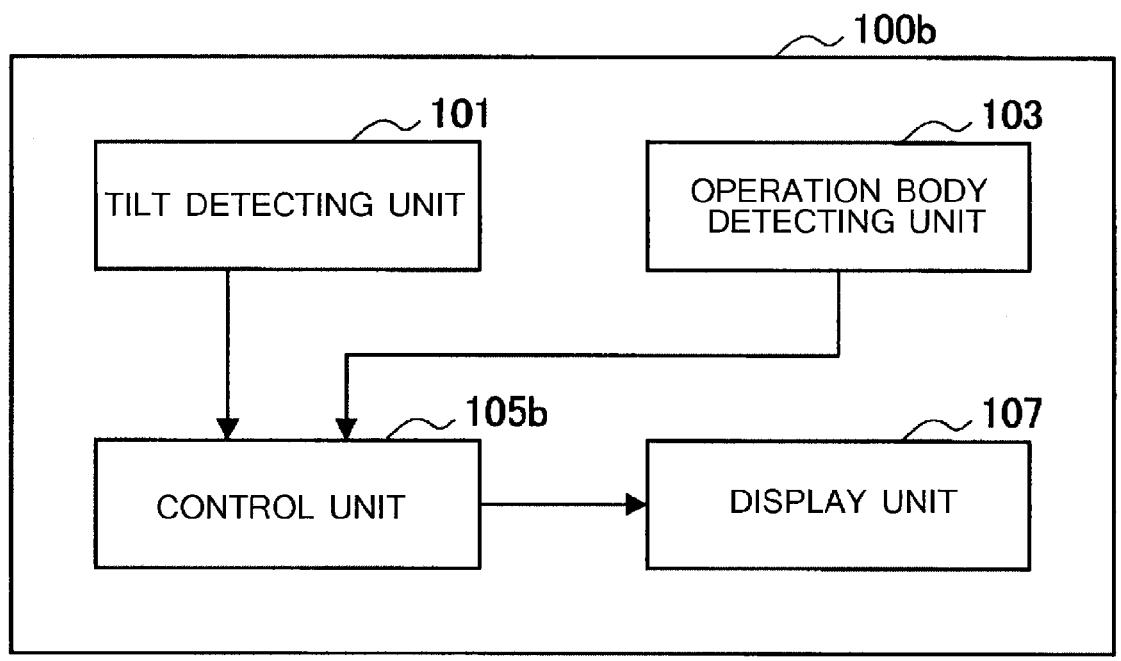
FIG. 13 is a functional block diagram of an information processing apparatus according to a second embodiment of the present disclosure.

13. FIG. 13 is a functional block diagram of an information processing apparatus according to a second embodiment of the present disclosure.

An information processing apparatus 100b according to a second embodiment of the present disclosure mainly includes a tilt detecting unit 101, an operation body detecting unit 103, a control unit 105b, and a display unit 107.

(Control Unit)

The control unit 105b may select a selection item of a layered structure based on an operation of a plurality of steps using a tilt detected by the tilt detecting unit 101. The control unit 105b may select a selection item of a first layer based on a first operation using a tilt with respect to a first direction. Also, when there is a selection item in a lower layer of the selection item selected by the first operation (second layer) among the selection items of the first layer, the control unit 105b may display selection items of the second layer, and may select a selection item of the second layer based on a second operation using a tilt with respect to a second direction perpendicular to the first direction. Also, the control unit 105b may confirm the selection of a selection item based on an input by an operation body detected by the operation body detecting unit 103.

(2-2. Example of Operation)

Figure 14:
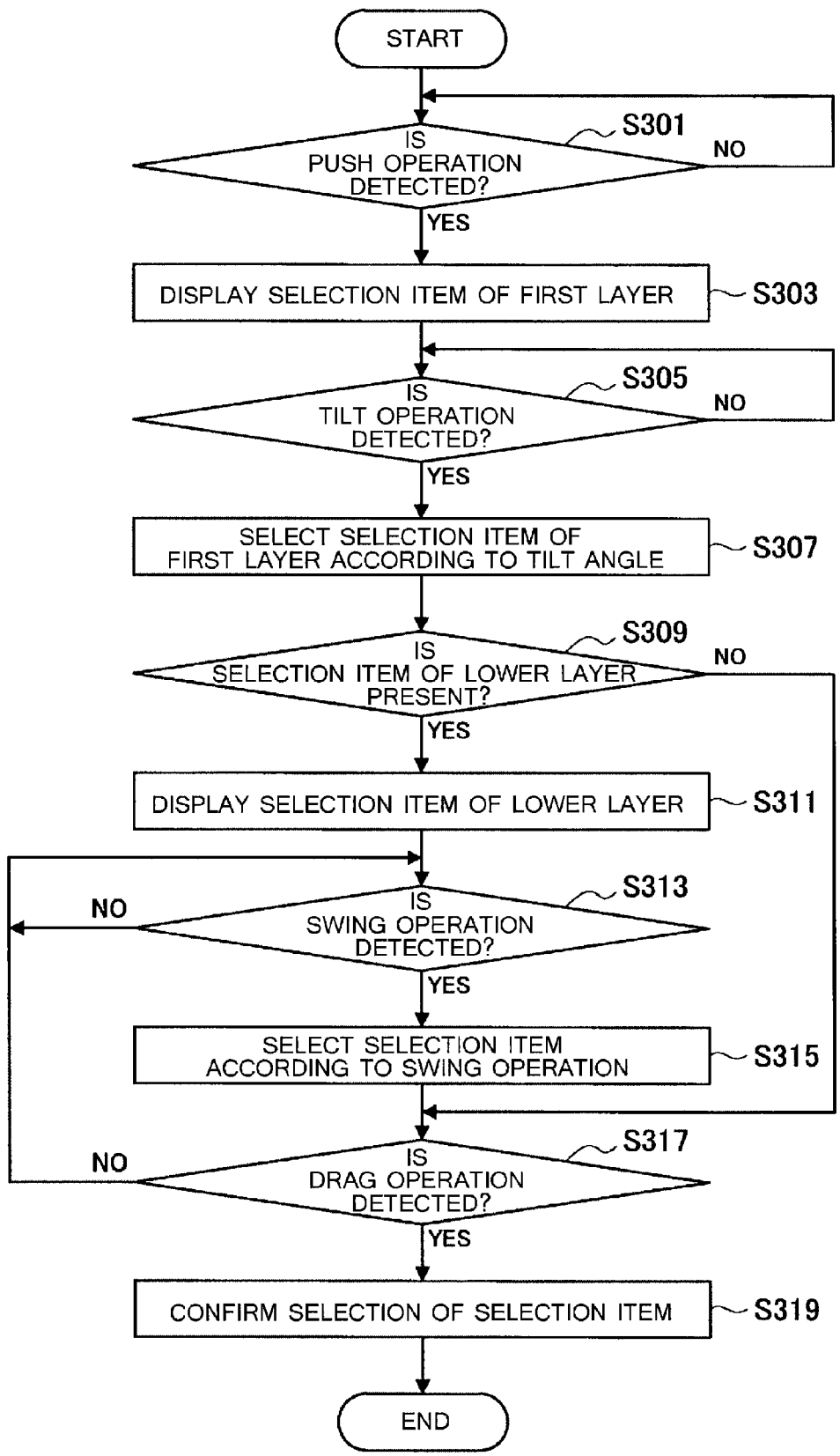
FIG. 14 is a flow chart illustrating an example of an operation of a selection operation of a selection item of the information processing apparatus according to the same embodiment.

Next, an operation of an information processing apparatus according to the same embodiment will be described with reference to FIG. 14. FIG. 14 is a flow chart illustrating an example of an operation of a selection operation of a selection item of the information processing apparatus according to the same embodiment.

In addition, an operation described herein is a generalized one of the operation of the information processing apparatus 100a described in the first embodiment, and the first embodiment is a specific example of the second embodiment.

First, the control unit 105b determines whether a push operation is detected by the operation body detecting unit 103 (S301). Herein, if a push operation is detected, the control unit 105b displays selection items of the first layer (S303). Then, the control unit 105b determines whether a tilt operation is detected by the tilt detecting unit 101 (S305). Then, if it is determined in step S305 that a tilt operation is detected, the control unit 105b selects a selection item of the first layer according to a tilt angle (S307).

Herein, the control unit 105b determines whether there are selection items in a lower layer of the first layer (S309). If it is determined in step S309 that there are selection items in the lower layer, the control unit 105b displays the selection items of the lower layer on the display unit 109 (S311). Then, in a state where the selection items of the lower layer are displayed, the control unit 105b determines whether a swing operation is detected by the tilt detecting unit 101 (S313). Herein, if a swing operation is detected, the control unit 105b selects a selection item according to the detected swing operation (S315). After a selection item is selected by step S315, or when it is determined in step S309 that there is no selection item in the lower layer, the control unit 105b determines whether a drag operation is detected by the operation body detecting unit 103 (S317). Herein, if it is determined that a drag operation is detected, the control unit 105b confirms the selection of a selection item based on the detected drag operation (S319).

As described above, according to the second embodiment of the present disclosure, the present technology may be applied in a case where a selection item of a more general layered structure is selected. For example, an example of a selection item of a layered structure may be a selection item in a screen that changes operation settings of the information processing apparatus 100b. For example, among the selection items in the screen changing the operation settings, a selection item for changing display-related settings may be selected. For example, a selection item changing a display size, a selection item changing the brightness of a screen, or the like, may be present in a lower layer of the selected selection item. Herein, when the user selects the selection item changing a display size, a display size in a selection item of a further lower layer may be selected.

3. Third Embodiment

Example of Application to Imaging Function 3-1. Example of Configuration

In the above-described second embodiment, a description has been given of applying the present technology when selecting a selection item of a more general layered structure. However, for example, other than the case of transmitting content to another apparatus in the first embodiment, the case of using an imaging function may be an example of the case where the application of the present technology is effective. Even when a touch sensor is used in an imaging apparatus, there is a strong need not to touch a display screen because the display screen is also a display screen displaying an image that is being captured. Therefore, it is also effective to apply an operation, which uses a tilt by the present technology, to a setting screen of an imaging function.

Figure 15:
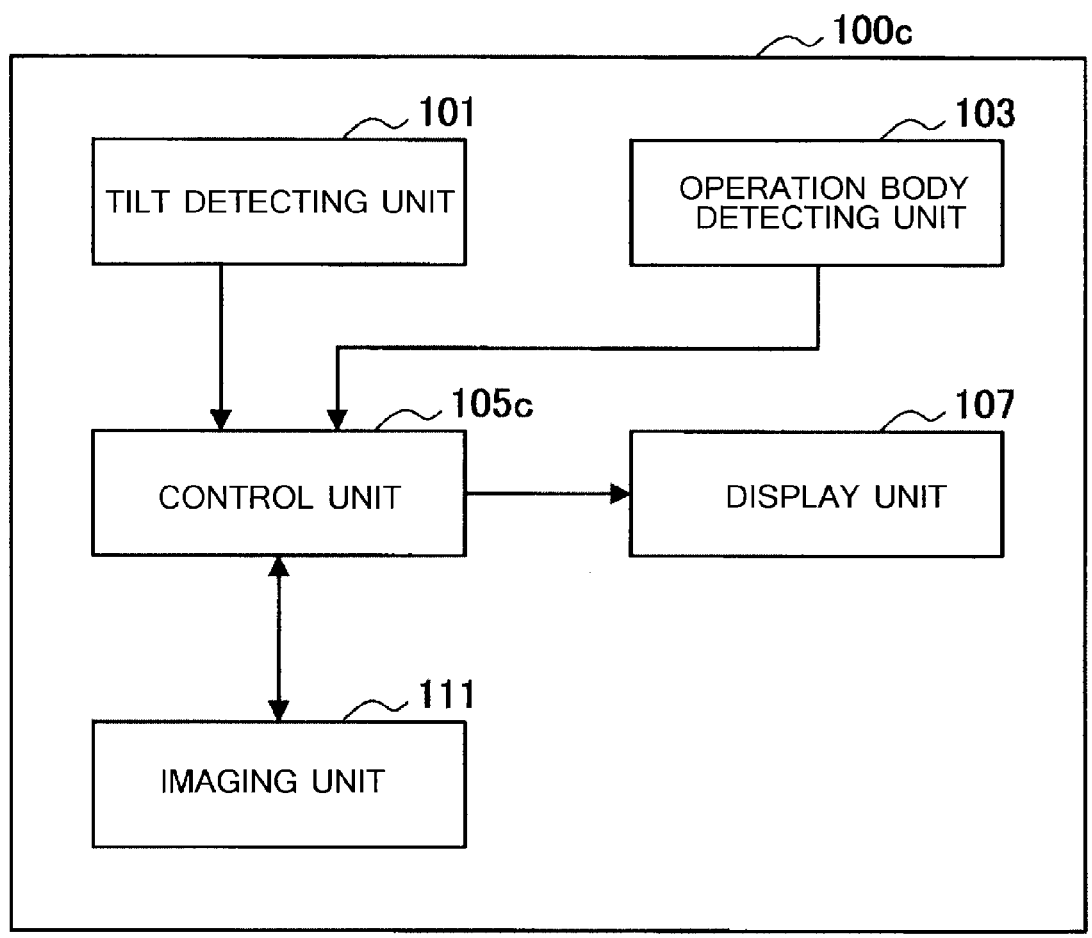
FIG. 15 is a functional block diagram of an information processing apparatus according to a third embodiment of the present disclosure.

An information processing apparatus according to a third embodiment of the present disclosure will be described with reference to FIG. 15. FIG. 15 is a functional block diagram of an information processing apparatus according to a third embodiment of the present disclosure. An information processing apparatus 100c according to a third embodiment of the present disclosure mainly includes, for example, a tilt detecting unit 101, a control unit 105c, a display unit 107, and an imaging unit 111.

(Control Unit)

Figure 16:
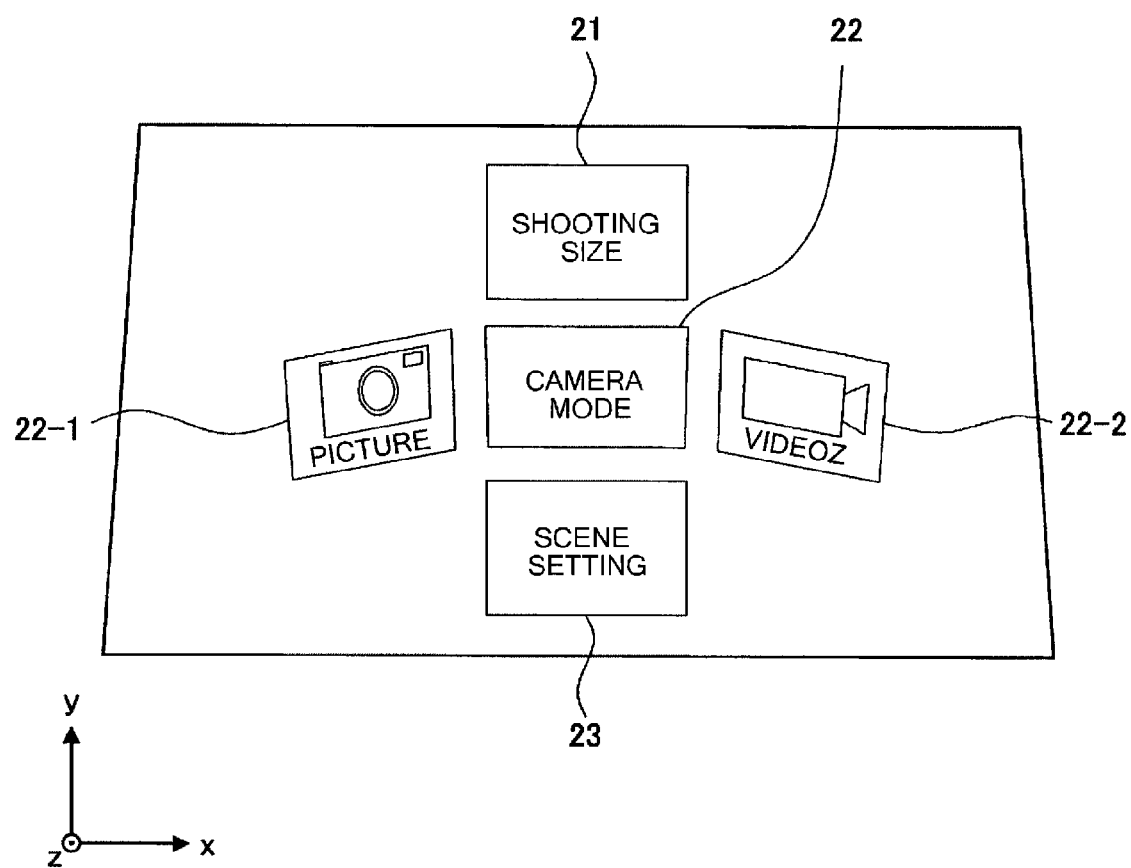
FIG. 16 is an explanatory diagram illustrating an example of a display screen displayed by the information processing apparatus according to the same embodiment.

The control unit 105c may further control an imaging function by the imaging unit 111. Also, a push operation or a drag operation used in the first embodiment and the second embodiment may be replaced with an operation by a hardware key in the present embodiment. When there is a strong need not to touch a display screen, if an operation by an operation body using a hardware key is used instead of an operation by an operation body using a touch sensor, it may be possible to prevent a fingerprint or a scratch from occurring on a display screen. The control unit 105c may display, for example, a setting screen of an imaging function as illustrated in FIG. 16. Herein, as illustrated, when a longitudinal direction of a casing (y direction) lies sideways, a tilt operation is performed using a tilt with respect to a lateral direction (x direction). Also, a swing operation is performed using a tilt with respect to the longitudinal direction (y direction).

The control unit 105c may select any one of a selection item 21, a selection item 22, a selection item 23, and the like by a tilt operation. Also, when there is a selection item of a lower layer of the selection item 22 displayed in the center as illustrated in FIG. 16, the control unit 105c may display a selection item 22-1 and a selection item 22-2 of the lower layer of the selection item 22. Also, the control unit 105c may select any one of the selection item 22-1 and the selection item 22-2 by a swing operation. For example, the control unit 105c may determine the selection of a selection item based on a determination operation by a hardware key.

(Imaging Unit)

The imaging unit 111 is a camera module including an imaging device such as a charge coupled device (CCD) imaging device or a complementary metal oxide semiconductor (CMOS) imaging device. The imaging unit 111 operates under the control of the control unit 105c. The imaging unit 111 may operate according to the settings set by the above-described setting screen.

The examples of the functions of the information processing apparatus 100 according to the first to third embodiment of the present disclosure have been shown above. The respective elements described above may be configured by using general-purpose members or circuits, or may be configured by hardware specialized in the functions of the respective elements. Also, an arithmetic device, such as a central processing unit (CPU) or the like, may perform the functions of the respective elements by reading a control program from a storage medium, such as a read only memory (ROM), a random access memory (RAM), or the like, which stores the control program describing a processing procedure of realizing these functions, and by interpreting and executing the program. Therefore, the configuration to be used may be appropriately modified depending on a level of technology when the present embodiment is implemented. An example of a hardware configuration of the information processing apparatus 100 will be described later.

Also, a computer program for realizing the respective functions of the information processing apparatus 100 according to the present embodiment described above may be created and implemented on a personal computer or the like. Also, a computer-readable recording medium on which such a computer program is stored may also be provided. The recording medium may be, for example, a magnetic disc, an optical disc, a magneto-optical disc, a flash memory, or the like. Also, the computer program may also be delivered through a network, without using the recording medium.

4. Example of Hardware Configuration

Figure 17:
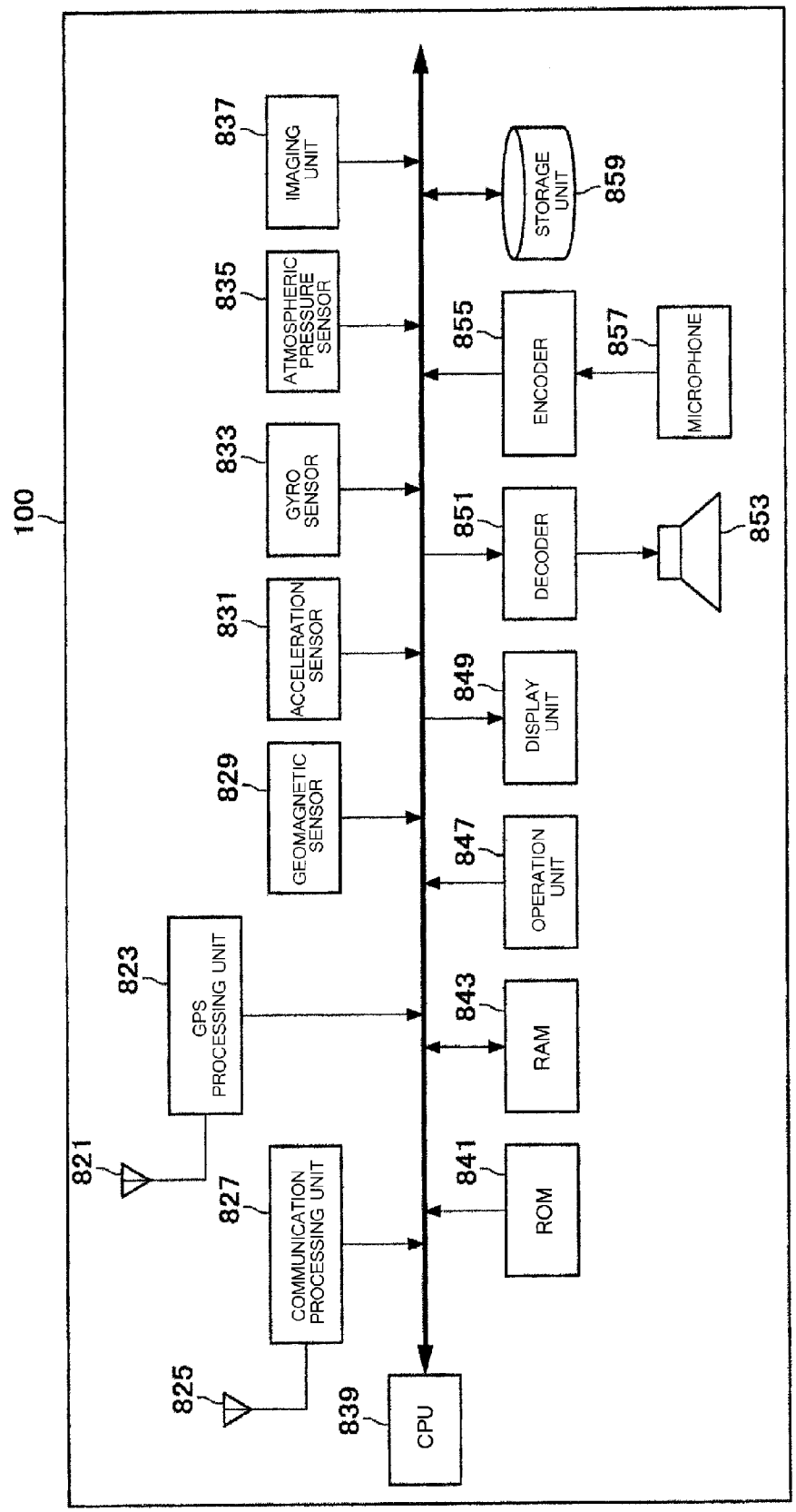
FIG. 17 is a block diagram illustrating an example of a hardware configuration of an information processing apparatus according to the first to third embodiments of the present disclosure.

Next, an example of a hardware configuration of an information processing apparatus 100 according to the first to third embodiments of the present disclosure will be described with reference to FIG. 17. FIG. 17 is a block diagram illustrating an example of a hardware configuration of an information processing apparatus according to the first to third embodiments of the present disclosure.

The information processing apparatus 100 includes, for example, a GPS antenna 821, a GPS processing unit 823, a communication antenna 825, a communication processing unit 827, a geomagnetic sensor 829, an acceleration sensor 831, a gyro sensor 833, an atmospheric pressure sensor 835, an imaging unit 837, a central processing unit (CPU) 839, a read only memory (ROM) 841, a random access memory (RAM) 843, an operation unit 847, a display unit 849, a decoder 851, a speaker 853, an encoder 855, a microphone 857, and a storage unit 859.

The GPS antenna 821 is an example of an antenna that receives a signal from a positioning satellite. The GPS antenna 821 may receive GPS signals from a plurality of GPS satellites, and inputs the received GPS signals to the GPS processing unit 823.

The GPS processing unit 823 is an example of a calculation unit that calculates position information based on a signal received from a positioning satellite. The GPS processing unit 823 calculates current position information based on a plurality of GPS signals inputted from the GPS antenna 821, and outputs the calculated position information. Specifically, the GPS processing unit 823 calculates a position of each GPS satellite from the orbital data of each GPS satellite, and calculates a distance from each GPS satellite to a relevant terminal apparatus 100 based on a time difference between a GPS signal transmission time and a GPS signal reception time. Then, a current three-dimensional position may be calculated based on the calculated position of each GPS satellite and the distance from each GPS satellite to the relevant terminal apparatus 100. In addition, the orbital data of a GPS satellite used herein may be included in, for example, a GPS signal. Alternatively, the orbital data of a GPS satellite may be acquired from an external server through the communication antenna 825.

The communication antenna 825 is, for example, an antenna that has a function of receiving a signal through a mobile communication network or a wireless local area network (LAN) communication network. The communication antenna 825 may provide the received signal to the communication processing unit 827.

The communication processing unit 827 has a function of performing various kinds of signal processing on a signal provided from the communication antenna 825. The communication processing unit 827 may provide the CPU 839 with a digital signal generated from a provided analog signal.

The geomagnetic sensor 829 is a sensor that detects geomagnetism as a voltage value. The geomagnetic sensor 829 may be a triaxial geomagnetic sensor that detects a geomagnetism of an X axis direction, a geomagnetism of a Y axis direction, and a geomagnetism of a Z axis direction. The geomagnetic sensor 829 may provide detected geomagnetic data to the CPU 839.

The acceleration sensor 831 is a sensor that detects acceleration as a voltage value. The acceleration sensor 831 may be a triaxial acceleration sensor that detects acceleration in an X axis direction, acceleration in a Y axis direction, and acceleration in a Z axis direction. The acceleration sensor 831 may provide detected acceleration data to the CPU 839.

The gyro sensor 833 is a kind of measurement equipment that detects the angle or acceleration of an object. The gyro sensor 833 may be a triaxial gyro sensor that detects a changing rate of a rotation angle around an X axis, a Y axis, and a Z axis (angular velocity) as a voltage value. The gyro sensor 833 may provide detected angular velocity data to the CPU 839.

The atmospheric pressure sensor 835 is a sensor that detects an ambient atmospheric pressure as a voltage value. The atmospheric pressure sensor 835 may detect an atmospheric pressure at a predetermined sampling frequency, and may provide detected atmospheric pressure data to the CPU 839.

The imaging unit 837 has a function of capturing a still image or a moving image through a lens under the control of the CPU 839. The imaging unit 837 may store a captured image in the storage unit 859.

The CPU 839 functions as an arithmetic processing unit and a control unit, and controls an overall operation in the information processing apparatus 100 according to various programs. Also, the CPU 839 may be a microprocessor. The CPU 839 may realize various functions according to various programs.

The ROM 841 may store programs used in the CPU 839, arithmetic parameters, or the like. The RAM 843 may temporarily store a program used in execution of the CPU 839, suitable variable parameters in the execution, or the like.

The operation unit 847 has a function of generating an input signal for allowing the user to perform a desired operation. The operation unit 847 may include, for example, an input unit, such as a touch sensor, a mouse, a keyboard, buttons, a microphone, switches, levers, and the like, for allowing the user to input information, and an input/output control unit for generating an input signal based on a user's input and outputting the signal to the CPU 839.

The display unit 849 is an example of an output unit. The display unit 849 may be a display device such as a liquid crystal display (LCD) device, an organic light emitting diode (OLED) display device, or the like. The display unit 849 may provide information to the user by displaying a screen.

The decoder 851 has a function of performing decoding, analog conversion, and the like, on inputted data and under the control of the CPU 839. For example, the decoder 851 decodes audio data inputted through the communication antenna 825 and the communication processing unit 827, and performs analog conversion to output an audio signal to the speaker 853. The speaker 853 may output a sound based on the audio signal provided from the decoder 851.

The encoder 855 has a function of performing digital conversion, encoding, and the like, on inputted data under the control of the CPU 839. The encoder 855 may perform digital conversion, encoding, and the like, on an audio signal inputted from the microphone 857, to output audio data. The microphone 857 may collect sounds and output the collected sound as an audio signal.

The storage unit 859 is a data storage device. The storage unit 859 may include a storage medium, a recording device recording data on the storage medium, a reading device reading data from the storage medium, and a deleting device deleting data stored in the storage medium, and the like. Herein, the storage medium may include, for example, a nonvolatile memory, such as a flash memory, a magnetoresistive random access memory (MRAM), a ferroelectric random access memory (FeRAM), a phase change random access memory (PRAM), and an electronically erasable and programmable read only memory (EEPROM), or a magnetic recording medium such as a hard disk drive (HDD).

While the preferred embodiments of the present disclosure have been described above with reference to the accompanying drawings, the technical scope of the present disclosure is not limited to such examples. Those skilled in the art of the present disclosure may find various alternations and modifications within the technical scope of the appended claims, and it should be understood that they will fall within the technical scope of the present disclosure.

For example, while the first embodiment describes that a moving image is transmitted to an external apparatus, the present technology is not limited to such an example. For example, transmitted content may be not only moving images such as movie, television program, and video program, but also music data such as music, performance, and radio program, image data such as picture, document, painting, and diagram, game, software, and the like.

Also, while the first embodiment describes the addition of content in a playlist as an example of processing content internally, the present technology is not limited to such an example. For example, content may be reproduced on the information processing apparatus 100*a*, or may be stored in the storage unit included in the information processing apparatus 100*a*.

Also, while the first and second embodiments describe that an operation by an operation body for confirming selection is a drag operation using a touch sensor, the present technology is not limited to such an example. The operation for confirming selection may be, for example, a press down of a hardware key. Alternatively, the operation for confirming selection may be a tap operation with respect to a selection item. In addition, various operations using a touch sensor may be used. However, in a case where a series of operation are performed from a push operation in the first embodiment, when a drag operation is used, it becomes an intuitive operation for the user, thus improving the operability.

Also, while the above embodiment describes selection items of two layers, the present technology is not limited to such an example. For example, a tilt operation and a swing operation may be alternately used to select selection items of three or more layers.

Also, in the present specification, the steps described in the flow chart may include not only a process performed serially in the order described, but also a process performed in a parallel manner or in an individual manner without being performed serially. Needless to say, even when the process is performed serially, the order described may be suitably changed according to circumstances.

In addition, the following configurations are included in the technical scope of the present disclosure.

(1) An information processing apparatus comprising: a processor that controls a display to display first layer data; and a detection unit that detects movement of the information processing apparatus, wherein the processor controls the display to display second layer data corresponding to the first layer data together with the first layer data based on a movement detected by the detection unit.

(2) The information processing apparatus of (1), wherein the detection unit is a tilt detection unit that detects a tilt movement of the information processing apparatus.

(3) The information processing apparatus of (1) or (2), further comprising: the display; and a touch sensor disposed on the display that detects a touch input.

(4) The information processing apparatus of any one of (1) to (3), wherein the second layer data corresponds to a process to be performed on the first layer data.

(5) The information processing apparatus of any one of (1) to (4), wherein the processor controls a process corresponding to the first layer data based on a selection corresponding to the displayed second layer data.

(6) The information processing apparatus of any one of (1) to (5), wherein the processor controls the display to display the second layer data based on a movement of the information processing apparatus in a first direction detected by the detection unit.

(7) The information processing apparatus of any one of (1) to (6), wherein the processor controls the display to display a plurality of graphic indicia corresponding to the second layer data based on a movement of the information processing apparatus in a first direction detected by the detection unit.

(8) The information processing apparatus of (7), wherein each of the graphic indicia correspond to a process to be performed on the first layer data based on a selection of each of the plurality of graphic indicia.

(9) The information processing apparatus of (8), wherein each of the plurality of graphic indicia correspond to a device capable of reproducing the first layer data.

(10) The information processing apparatus of (9), wherein, upon selection of one of the plurality of graphic indicia, the processor instructs the device corresponding to the one of the plurality of graphic indicia to reproduce the first layer data.

(11) The information processing apparatus of any one of (7) to (10), wherein the processor controls the display to scroll the plurality of graphic indicia corresponding to the second layer data based on movement of the information processing apparatus in a second direction.

(12) The information processing apparatus of any one of (6) to (11), wherein the processor controls the display to display second layer data based on a movement of the information processing apparatus in a second direction by the detection unit.

(13) The information processing apparatus of claim (12), wherein the processor controls the display to display graphic indicia corresponding to the second layer data based on a movement of the information processing apparatus in the second direction detected by the detection unit.

(14) The information processing apparatus of (13), wherein the graphic indicia corresponds to a playlist.

(15) The information processing apparatus of (14), wherein, upon selection of the graphic indicia, the processor controls the first layer data to be added to the playlist.

(16) The information processing apparatus of any one of (1) to (3), wherein the processor controls the display to display a first graphic indicia corresponding to the second layer data upon receiving an input selecting the first layer data at the touch panel.

(17) The information processing apparatus of (16), wherein the processor controls the display to display second graphic indicia corresponding to second layer data upon receiving the input selecting the first layer data at the touch panel.

(18) A method performed by an information processing apparatus, the method comprising: controlling, by a processor of the information processing apparatus, a display to display first layer data; detecting, by a detection unit of the information processing apparatus, movement of the information processing apparatus; and controlling, by the processor, the display to display second layer data corresponding to the first layer data together with the first layer data based on a detected movement.

(19) A non-transitory computer-readable medium including computer program instructions, which when executed by an information processing apparatus, cause the information processing apparatus to perform a method comprising: controlling a display to display first layer data; detecting movement of the information processing apparatus; and controlling the display to display second layer data corresponding to the first layer data together with the first layer data based on a detected movement.

REFERENCE SIGNS LIST

100 Information processing apparatus
101 Tilt detecting unit
103 Operation body detecting unit
105 Control unit
107 Display unit
109 Communication unit
111 Imaging unit

The invention claimed is:

1. An information processing apparatus, comprising:
circuitry configured to:
control display of first layer data;
detect movement of the information processing apparatus;
determine a plurality of reproducible devices separate from the information processing apparatus and within a predetermined distance of the information processing apparatus, the reproducible devices reproducing the first layer data;
receive, from each of the plurality of reproducible devices within the predetermined distance of the information processing apparatus, distance information and a plurality of thumbnail images corresponding to the plurality of reproducible devices;
generate a list of the plurality of reproducible devices coupled with the received distance information and thumbnail images;
determine second layer data from the generated list of the plurality of reproducible devices by arranging the plurality of reproducible devices in an order, wherein the order is determined according to the received distance information for each of the plurality of reproducible devices, and
the second layer data includes the received plurality of thumbnail images for each of the plurality of reproducible devices; and
control display of the second layer data and the first layer data on a display, based on the detected movement of the information processing apparatus, wherein
the circuitry displays the first layer data on a first section the display,
the circuitry displays the second layer data on a second section of the display, and
a reproducible device of the plurality of reproducible devices included in the second layer data, which is at a shortest distance according to the received distance information, is displayed in a center of the second section of the display.

2. The information processing apparatus of claim 1, wherein the circuitry is further configured to detect a tilt, swing, and rotation movement of the information processing apparatus and amounts of angle of respective movement from a predetermined reference point of respective movement.

3. The information processing apparatus of claim 1, further comprising:
a display; and
a touch sensor on the display, the touch sensor detecting a touch input, wherein
the circuitry is further configured to transmit the first layer data to one of the plurality of reproducible devices based on a movement of the information processing apparatus in a first and a second direction detected by the circuitry, and
the one of the plurality of reproducible devices reproduces the first layer data.

4. The information processing apparatus of claim 1, wherein the second layer data corresponds to a process to be performed on the first layer data.

5. The information processing apparatus of claim 1, wherein the circuitry controls a process corresponding to the first layer data based on a selection corresponding to the displayed second layer data.

6. The information processing apparatus of claim 1, wherein the circuitry controls display of the second layer data based on a movement of the information processing apparatus in a first direction detected by the circuitry.

7. The information processing apparatus of claim 1, wherein the circuitry controls display of a plural of graphic indicia corresponding to the second layer data based on a movement of the information processing apparatus in a first direction detected by the detection unit circuitry.

8. The information processing apparatus of claim 7, wherein each of the graphic indicia corresponds to a process to be performed on the first layer data based on a selection of each of the plurality of graphic indicia.

9. The information processing apparatus of claim 8, wherein each of the plurality of graphic indicia corresponds to each of the plurality of reproducible devices capable of reproducing the first layer data.

10. The information processing apparatus of claim 9, wherein, upon selection of one of the plurality of graphic indicia, the processor instructs one of the plurality of reproducible devices corresponding to the one of the plurality of graphic indicia to reproduce the first layer data.

11. The information processing apparatus of claim 7, wherein the circuitry controls display of a scrolling operation of the plurality of graphic indicia corresponding to the second layer data based on a movement of the information processing apparatus in a second direction.

12. The information processing apparatus of claim 6, wherein the circuitry controls display of the second layer data based on a movement of the information processing apparatus in a second direction detected by the circuitry.

13. The information processing apparatus of claim 12, wherein the circuitry controls display of a plurality of graphic indicia corresponding to the second layer data based on a movement of the information processing apparatus in the second direction detected by the circuitry.

14. The information processing apparatus of claim 13, wherein the graphic indicia corresponds to a playlist.

15. The information processing apparatus of claim 14, wherein, upon selection of the graphic indicia, the circuitry controls the first layer data to be added to the playlist.

16. The information processing apparatus of claim 3, wherein the circuitry controls the display to display a first graphic indicia corresponding to the second layer data upon receiving an input selecting the first layer data at the touch panel.

17. The information processing apparatus of claim 16, wherein the circuitry controls the display to display second graphic indicia corresponding to the second layer data upon receiving the input selecting the first layer data at the touch panel.

18. A method performed by an information processing apparatus, the method comprising:
controlling, by circuitry of the information processing apparatus, a display of first layer data;
detecting, by the circuitry, movement of the information processing apparatus;
determining, by the circuitry, a plurality of reproducible devices separate from the information processing apparatus and within a predetermined distance of the information processing apparatus, the reproducible devices reproducing the first layer data:
receiving, by the circuitry, from each of the plurality of reproducible devices within the predetermined distance of the information processing apparatus, distance information and a plurality of thumbnail images corresponding to the plurality of reproducible devices;
generating, by the circuitry, a list of the plurality of reproducible devices coupled with the received distance information and thumbnail images;
determining, by the circuitry, second layer data from the generated list of the plurality of reproducible devices by arranging the plurality of reproducible devices in an order, wherein the order is determined according to the received distance information for each of the plurality of reproducible devices, and
the second layer data includes the received plurality of thumbnail images for each of the plurality of reproducible devices; and
controlling, by the circuitry, display of the second layer data the first layer data on a display, based on the detected movement of the information processing apparatus, wherein
the circuitry displays the first layer data on a first section of the display,
the circuitry displays the second layer data on a second section of the display, and
a reproducible device of the plurality of reproducible devices included in the second layer data, which is at a shortest distance according to the received distance information, is displayed in a center of the second section of the display.

19. A non-transitory computer-readable medium storing computer program executable instructions, which when executed by an information processing apparatus, cause the information processing apparatus to:
control display of first layer data;
detect movement of the information processing apparatus;
determine a plurality of reproducible devices separate from the information process n apparatus and within a predetermined distance of the information processing apparatus, the reproducible devices reproducing the first layer data;
receive, from each of the plurality of reproducible devices within the predetermined distance of the information processing apparatus, distance information and a plurality of thumbnail images corresponding to the plurality of reproducible devices;
generate a list of the plurality of reproducible devices coupled with the received distance information and thumbnail images;
determine second layer data from the generated of the plurality of reproducible devices by arranging the plurality of reproducible devices in an order, wherein
the order is determined according to the received distance information for each of the plurality of reproducible devices, and
the second layer data includes the received plurality of thumbnail images for each of the plurality of reproducible devices; and
control display of the second layer data and the first layer data on a display, based on the detected movement of the information processing apparatus, wherein
the information processing apparatus is caused to display the first layer data on a first section of the display,
the information processing apparatus is caused to display the second layer data on a second section of the display, and
the information processing apparatus is caused to display a reproducible device of the plurality of reproducible devices included in the second layer data, which is at a shortest distance according to the received distance information, in a center of the second section of the display.

20. The information processing apparatus of claim 1, wherein the circuitry includes a GPS device, geomagnetic sensor, acceleration sensor, gyro sensor, or atmospheric pressure sensor.

* * * * *